United States Patent
Dimou et al.

(10) Patent No.: US 12,284,591 B2
(45) Date of Patent: Apr. 22, 2025

(54) EARLY DETECTION OF FORWARDING FOR MULTI-HOP ULTRA-RELIABLE LOW LATENCY COMMUNICATIONS

(71) Applicant: QUALCOMM INCORPORATED, San Diego, CA (US)

(72) Inventors: Konstantinos Dimou, San Francisco, CA (US); Piyush Gupta, Bridgewater, NJ (US); Kapil Gulati, Belle Mead, NJ (US); Junyi Li, Chester, NJ (US); Jingyuan Liu, Basking Ridge, NJ (US); Alexander Leonidov, Somerset, NJ (US); Sony Akkarakaran, Poway, CA (US); Wooseok Nam, San Diego, CA (US); Yan Zhou, San Diego, CA (US); Ozge Koymen, Princeton, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/757,732

(22) PCT Filed: Jan. 8, 2021

(86) PCT No.: PCT/US2021/012779
§ 371 (c)(1),
(2) Date: Jun. 20, 2022

(87) PCT Pub. No.: WO2021/146119
PCT Pub. Date: Jul. 22, 2021

(65) Prior Publication Data
US 2023/0027103 A1    Jan. 26, 2023

(30) Foreign Application Priority Data

Jan. 14, 2020 (GR) .............................. 20200100012

(51) Int. Cl.
*H04W 40/26* (2009.01)
*H04B 7/155* (2006.01)
(Continued)

(52) U.S. Cl.
CPC ........ H04W 40/26 (2013.01); H04B 7/15507 (2013.01); H04L 1/0053 (2013.01); H04L 1/18 (2013.01); *H04L 2001/0097* (2013.01)

(58) Field of Classification Search
CPC .. H04W 40/26; H04B 7/15507; H04L 1/0053; H04L 1/18; H04L 2001/0097
See application file for complete search history.

(56) References Cited

U.S. PATENT DOCUMENTS

2017/0244469 A1    8/2017  Seo et al.
2018/0206176 A1*   7/2018  Panteleev ............. H04W 72/20
(Continued)

FOREIGN PATENT DOCUMENTS

CN    105846882 A    8/2016
CN    107113538 A    8/2017
(Continued)

OTHER PUBLICATIONS

International Search Report and Written Opinion—PCT/US2021/012779—ISA/EPO—May 7, 2021.

*Primary Examiner* — Hashim S Bhatti
(74) *Attorney, Agent, or Firm* — Holland & Hart LLP

(57) ABSTRACT

Methods, systems, and devices for wireless communications are described. In some communications systems, interference may impede signaling between a base station and a target user equipment (UE) such that a base station may identify a donor UE to relay communications to the target UE. The donor UE may receive a coded data packet from the base station, and may identify a radio network temporary identifier (RNTI) scrambling code for the packets addressed (Continued)

to the target UE. In cases where the donor UE identifies that the packet has an RNTI scrambling code associated with the target UE, the donor UE may forward the coded data packet to the target UE base on the RNTI scrambling code. Such early detection of data packets addressed to the target UE may allow for the UE to forward a data packet without fully decoding the packet.

28 Claims, 12 Drawing Sheets

(51) Int. Cl.
*H04L 1/00* (2006.01)
*H04L 1/18* (2023.01)

(56) References Cited

U.S. PATENT DOCUMENTS

| | | |
|---|---|---|
| 2018/0324848 A1 | 11/2018 | Baghel et al. |
| 2019/0289608 A1* | 9/2019 | Liu ........................ H04W 76/18 |
| 2020/0236581 A1* | 7/2020 | Zhang ................. H04W 28/082 |
| 2021/0021536 A1* | 1/2021 | Ganesan ............... H04L 1/1874 |
| 2021/0105126 A1* | 4/2021 | Yi ......................... H04L 1/1671 |

FOREIGN PATENT DOCUMENTS

| | | |
|---|---|---|
| CN | 103959852 B | 9/2018 |
| EP | 2925044 A1 | 9/2015 |
| WO | WO-2020200125 A1 | 10/2020 |

* cited by examiner

EARLY DETECTION OF FORWARDING FOR MULTI-HOP ULTRA-RELIABLE LOW LATENCY COMMUNICATIONS

CROSS REFERENCE

The present application for patent is a 371 national stage filing of International PCT Application No. PCT/US2021/012779 by DIMOU et al., entitled "EARLY DETECTION OF FORWARDING FOR MULTI-HOP ULTRA-RELIABLE LOW LATENCY COMMUNICATIONS," filed Jan. 8, 2021 and claims the benefit of Greece Provisional Patent Application No. 20200100012 by DIMOU et al., entitled "EARLY DETECTION OF FORWARDING FOR MULTI-HOP ULTRA-RELIABLE LOW LATENCY COMMUNICATIONS," filed Jan. 14, 2020; each of which is assigned to the assignee hereof, and each of which is expressly incorporated by reference herein.

FIELD OF TECHNOLOGY

The following relates generally to wireless communications and more specifically to early detection of forwarding for multi-hop ultra-reliable low latency communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a direct link between a serving base station and a target UE may be blocked by some signaling interference. To communicate with the target UE, the base station may identify a donor UE that may relay communications between the base station and the target UE. In some systems, however, the process of relaying communications using a donor UE may increase latency and may affect the ability of the network to support retransmissions.

SUMMARY

The described techniques relate to improved methods, systems, devices, and apparatuses that support early detection of forwarding for multi-hop ultra-reliable low latency communications (URLLC). In some cases, a user equipment (UE) may communicate directly with multiple base stations in a wireless system supporting multi-transmission-reception point (TRP) communications in millimeter wave frequencies. In some cases, however, interference or other blockage may impede signaling between a base station and a target UE. To communicate with the target UE, a base station may identify a donor UE to relay communications from the base station to the target UE while avoiding the identified signal blockage. To reduce the round-trip time for the transmission of a packet between the base station and the target UE, the donor UE may have a capability to detect at an early stage that a packet or transport block is addressed to the target UE. For example, the donor UE may forward the packet to the target UE without fully decoding the packet, which may reduce the amount of time for transmitting the packet to the target UE.

In one example, the donor UE may receive a coded data packet from the base station and may identify a radio network temporary identifier (RNTI) scrambling code for the packets addressed to the target UE. In cases where the donor UE identifies that the packet has an RNTI scrambling code associated with the target UE, the donor UE may forward the coded data packet to the target UE base on the RNTI scrambling code. Such early detection of data packets addressed to the target UE may reduce the amount of time for a data packet to be transmitted between the target UE and the base station and may support retransmissions and communications efficiency.

A method of wireless communications at a first UE is described. The method may include receiving a coded data packet from a base station in a millimeter wave frequency band, and forwarding the coded data packet to a second UE based on a RNTI scrambling code for data packets associated with the second UE.

An apparatus for wireless communications at a first UE is described. The apparatus may include a processor, memory coupled with the processor, and instructions stored in the memory. The instructions may be executable by the processor to cause the apparatus to receive a coded data packet from a base station in a millimeter wave frequency band, and forward the coded data packet to a second UE based on a RNTI scrambling code for data packets associated with the second UE.

Another apparatus for wireless communications at a first UE is described. The apparatus may include means for receiving a coded data packet from a base station in a millimeter wave frequency band, and forwarding the coded data packet to a second UE based on a RNTI scrambling code for data packets associated with the second UE.

A non-transitory computer-readable medium storing code for wireless communications at a first UE is described. The code may include instructions executable by a processor to receive a coded data packet from a base station in a millimeter wave frequency band, and forward the coded data packet to a second UE based on a RNTI scrambling code for data packets associated with the second UE.

In some examples of the method, apparatuses, and non-transitory computer-readable medium described herein, forwarding the coded data packet further may include operations, features, means, or instructions for decoding at least a portion of the coded data packet based on the RNTI scrambling code for data packets associated with the second UE.

Some examples of the method, apparatuses, and non-transitory computer-readable medium described herein may further include operations, features, means, or instructions for identifying that the first UE supports a capability to forward the coded data packet without decoding at least a portion of the coded data packet, and transmitting a notification of the capability to the second UE.

Some examples of the method, apparatuses, and non-transitory computer-readable medium described herein may further include operations, features, means, or instructions for receiving an indication that the coded data packet may be addressed to the second UE, and forwarding the coded data packet to the second UE based on the indication.

In some examples of the method, apparatuses, and non-transitory computer-readable medium described herein, the indication includes a 1-bit physical downlink control channel indicator.

Some examples of the method, apparatuses, and non-transitory computer-readable medium described herein may further include operations, features, means, or instructions for receiving a hybrid automatic repeat request (HARQ) message from the second UE based on the coded data packet, and forwarding the HARQ message from the second UE to the base station.

Some examples of the method, apparatuses, and non-transitory computer-readable medium described herein may further include operations, features, means, or instructions for receiving a second coded data packet from the base station, forwarding the second coded data packet to the second UE at a first time, and forwarding the HARQ message to the base station at a second time simultaneous with the first time.

In some examples of the method, apparatuses, and non-transitory computer-readable medium described herein, the HARQ message includes a negative acknowledgement, a positive acknowledgement, or method for wireless communications another feedback message.

Some examples of the method, apparatuses, and non-transitory computer-readable medium described herein may further include operations, features, means, or instructions for receiving a retransmission of the coded data packet from the base station, determining the retransmission includes a RNTI scrambling code for data packets associated with the second UE, and forwarding the retransmission to the second UE based on the RNTI scrambling code.

In some examples of the method, apparatuses, and non-transitory computer-readable medium described herein, the RNTI scrambling code for data packets associated with the second UE may be different from another RNTI scrambling code associated with the first UE.

In some examples of the method, apparatuses, and non-transitory computer-readable medium described herein, identifying the RNTI scrambling code further may include operations, features, means, or instructions for identifying the RNTI scrambling code for data packets associated with the first UE, and decoding the coded data packet.

Some examples of the method, apparatuses, and non-transitory computer-readable medium described herein may further include operations, features, means, or instructions for establishing an radio resource control connection between the second UE and the base station, identifying a radio bearer configured by the base station, and establishing a link between the base station, the second UE, or a combination thereof based on the radio bearer.

In some examples of the method, apparatuses, and non-transitory computer-readable medium described herein, the radio bearer may be established for URLLC.

In some examples of the method, apparatuses, and non-transitory computer-readable medium described herein, the first UE and the second UE include a group of UE.

Some examples of the method, apparatuses, and non-transitory computer-readable medium described herein may further include operations, features, means, or instructions for transmitting an indication of the data packet to the second UE.

In some examples of the method, apparatuses, and non-transitory computer-readable medium described herein, the communications between the first UE, the second UE, and the base station may be configured according to a traffic cycle time.

In some examples of the method, apparatuses, and non-transitory computer-readable medium described herein, the first UE includes a repeater for data packets transmitted from the base station to the second UE.

DETAILED DESCRIPTION

Figure 1:
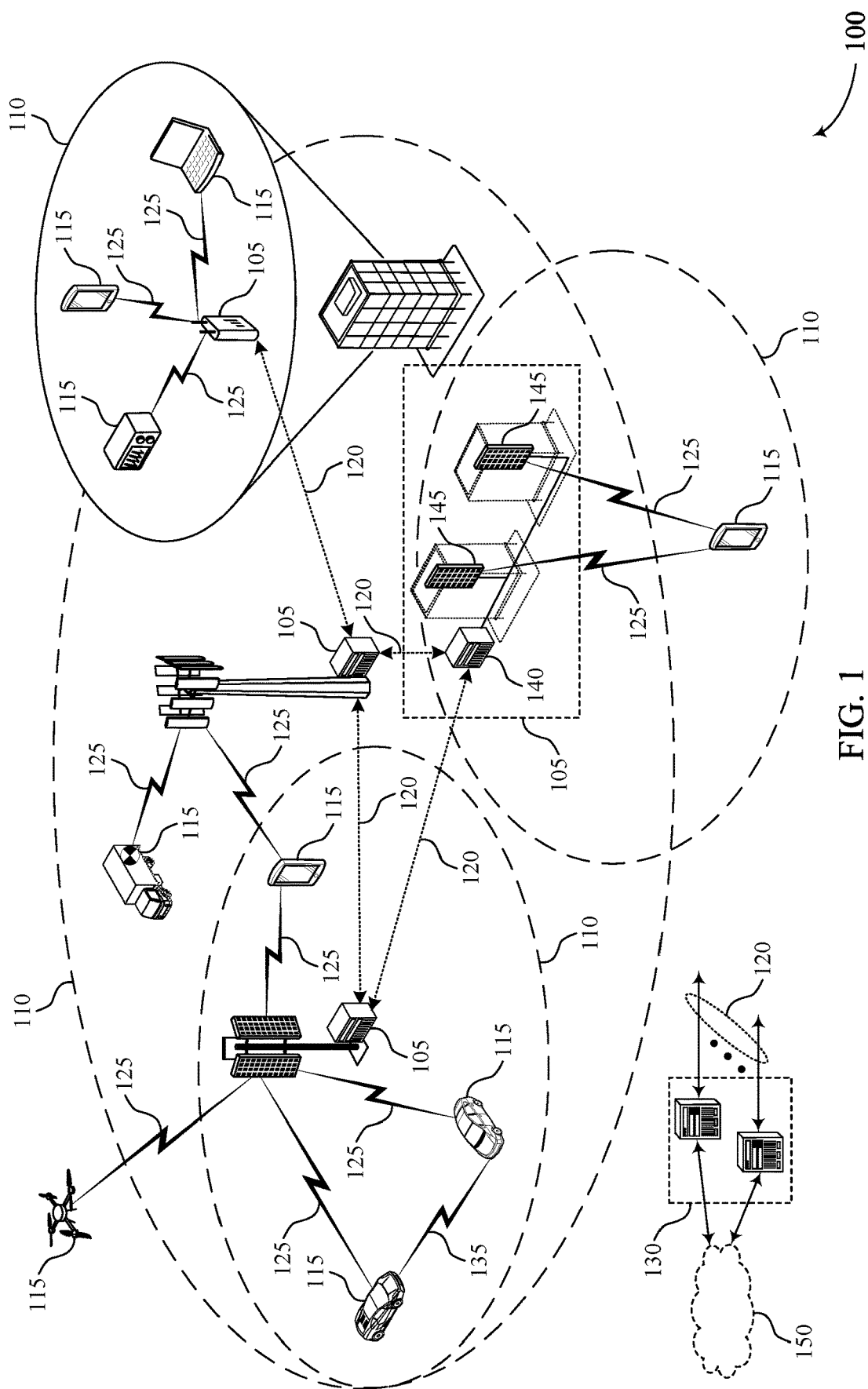
FIG. 1 illustrates an example of a wireless communications system that supports early detection of forwarding for multi-hop ultra-reliable low latency communications in accordance with aspects of the present disclosure.

Some wireless communications systems may operate in accordance with a number of different performance targets, such as those that support ultra-reliable low latency communications (URLLC). Further, the wireless communications system may support transmissions configured according to a traffic cycle time. For example, in some applications, a packet may be generated and transmitted every 1 ms (e.g., a 1 ms cycle time). A user equipment (UE) may communicate directly with multiple base stations in a wireless system, but in some cases, such as in a system with multi-transmission-reception points (TRP), interference or other blockage may impede signaling between a base station and a target UE. In some cases, the network may determine such signal blockage by identifying a threshold number of negative feedback transmissions for a link between the target UE and the serving base station.

To communicate with the target UE and avoid the identified signal blockage, the base station may identify a neighboring UE to act as a donor UE to relay communications from the base station to the target UE. The base station may send a data packet intended for the target UE to the donor UE, and the donor UE may retransmit the packet to the target UE. In some cases, however, the use of a donor UE may increase the time for the packet to be transmitted from the base station to the target UE. For example, in networks using a specific traffic cycle time, a round-trip time for a packet (e.g., the time for transmitting the packet to the target UE and for the target UE to transmit HARQ feedback associated with successful or unsuccessful reception of the packet) may exceed half of the cycle time. The network therefore may not support retransmissions in cases where the target UE transmits a NACK, because the time for retransmission may exceed the configured traffic cycle time.

To support retransmissions in such multi-hop systems, the round-trip time for transmissions the base station and the target UE may be reduced (e.g., to half the cycle time or less) so that at least one transmission and one retransmission may be completed within a given traffic cycle. In some cases, the donor UE may detect at an early stage that a packet or transport block is addressed to the target UE, and the donor UE may forward the packet to the target UE without fully decoding the packet. For example, the donor UE may decode only a portion of the packet (e.g., a header of the packet, or another portion of the packet).

In one example, the donor UE may identify different radio network temporary identifier (RNTI) scrambling codes for packets addressed to itself (e.g., the donor UE) and for packets addressed to the target UE. The donor UE may then act as a repeater (e.g., the donor UE may retransmit the packet to the target UE without fully decoding the packet) based on determining that the RNTI scrambling code is associated with the target UE. In cases where the UE identifies that the packet has an RNTI scrambling code associated with itself, the donor UE may fully decode the packet. Accordingly, the donor may use the RNTI scrambling code to identify whether the packet is addressed to the target UE, and whether the donor UE can skip processing the entire packet.

In some other cases, the donor UE may identify an indication transmitted with a physical downlink control channel (PDCCH) (e.g., a 1-bit indication) that may indicate whether a packet transmitted with the a current physical downlink shared channel (PDSCH) is addressed to the target UE or to the donor UE. In some cases, the 1-bit indication may allow the donor UE to determine at an early stage whether the packet is addressed to itself or to the target UE.

By identifying at an early stage which packets to forward without fully decoding in addition to forwarding the packets in the physical layer, the donor UE may reduce the round-trip time for a packet transmitted from the base station to the target UE. In some cases, the round-trip time may be reduced to such extent, which may allow the network to support retransmissions within the given traffic cycle.

Aspects of the disclosure are initially described in the context of wireless communications systems. For example, aspects of the disclosure are described with respect to UEs 115, and base stations 105, which may be examples of UEs 115 and base stations 105 described with reference to FIG. 1. Aspects of the disclosure are further illustrated by and described with reference to apparatus diagrams, system diagrams, and flowcharts that relate to early detection of forwarding for multi-hop URLLC.

FIG. 1 illustrates an example of a wireless communications system 100 that supports early detection of forwarding for multi-hop URLLC communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low latency communications, or various combinations thereof. For example, the wireless communications system 100 may be configured to support ultra-reliable low latency communications (URLLC) or mission critical communications. The UEs 115 may be designed to support ultra-reliable, low latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low latency, mission critical, and ultra-reliable low latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may be configured according to a number of different performance targets, such as those that support URLLC. In some examples, a wireless communications system may support transmissions configured according to a traffic cycle time, for example, a 1 ms traffic cycle time.

A UE 115 may communicate directly with multiple base stations 105 in a wireless system supporting multi-TRP communications. In some cases, however, interference or other blockage may impede signaling between base stations 105 and a target UE 115. To communicate with the target UE 115, a base station 105 may identify a neighboring UE 115 that may act as a donor UE to relay communications from the base station 105 to the target UE 115 to avoid the identified signal blockage. The base station 105 may send a data packet to the donor UE 115, and the donor UE 115 may forward the packet to the target UE 115. In some cases, however, the use of a donor UE 115 may increase the time for the packet to be transmitted from the base station to the target UE 115 such that the network may not support retransmissions for the packet, because the time for a retransmission may exceed the configured traffic cycle time.

To reduce the round-trip time for the transmission of a packet between the base station 105 and the target UE 115, the donor UE 115 may have a capability to detect at an early stage that a packet or transport block is addressed to the target UE 115. The donor UE 115 may forward the packet to the target UE 115 without fully decoding the packet, which may reduce the amount of time for transmitting the packet to the target UE 115. In one example, the donor UE 115 may identify different RNTI scrambling codes for packets addressed to itself (e.g., the donor UE 115) and for packets addressed to the target UE 115. In cases where the donor UE 115 identifies that the packet has an RNTI scrambling code associated with the target UE 115, the donor UE 115 may forward the packet without full decoding.

In another example, the donor UE 115 may identify an indication transmitted with the PDCCH of the packet (e.g., a 1-bit indication) that may indicate whether a packet transmitted with the current PDSCH is addressed to the target UE 115 or to the donor UE 115. In some cases, this kind of indication may allow the donor UE 115 to determine at an early stage whether the packet is addressed to itself or to the target UE 115, and whether the donor UE 115 may skip fully decoding the packet.

Figure 2:
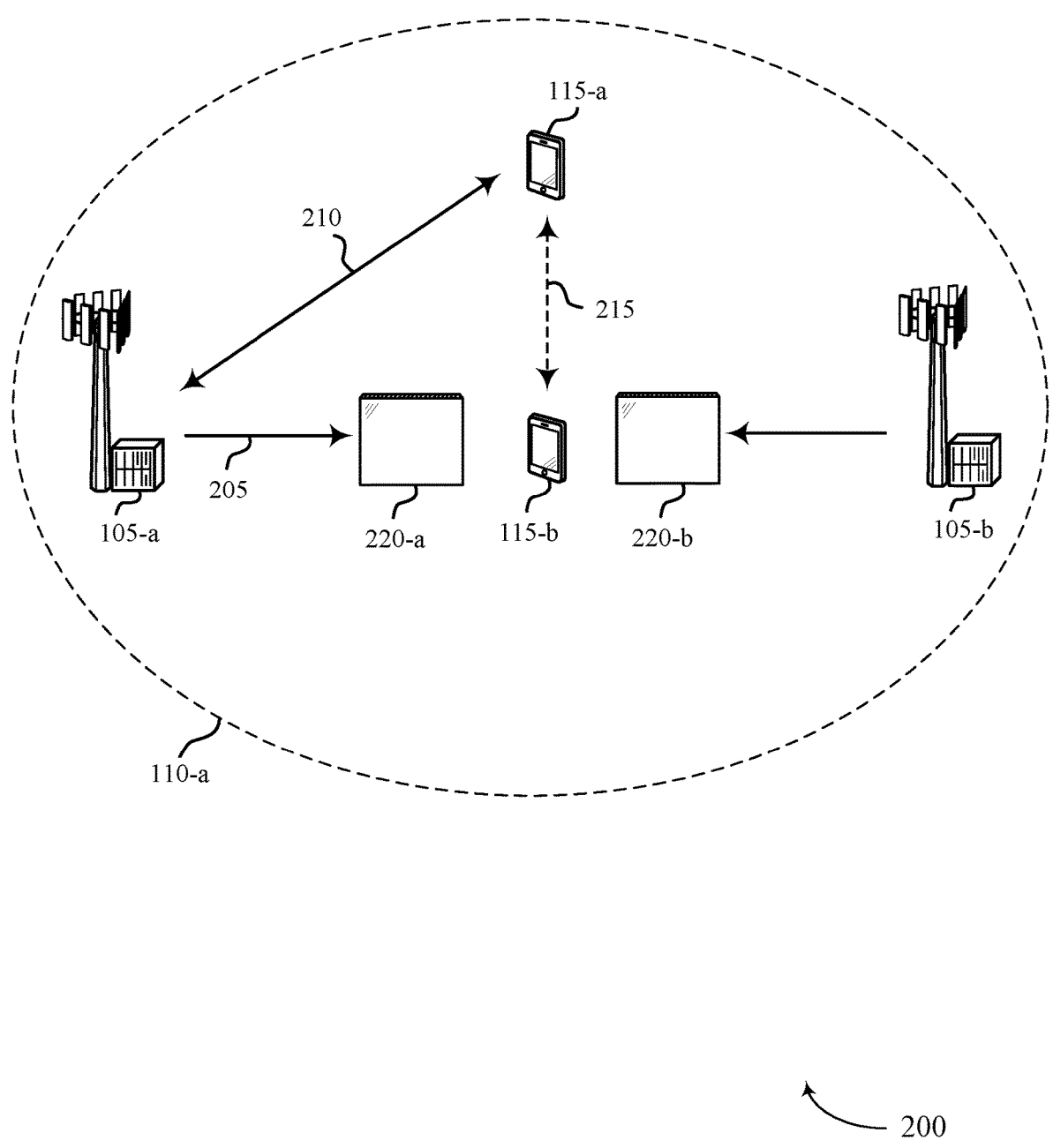
FIG. 2 illustrates an example of a wireless communications system that supports early detection of forwarding for multi-hop ultra-reliable low latency communications in accordance with aspects of the present disclosure.

FIG. 2 illustrates an example of a wireless communications system 200 that supports early detection of forwarding for multi-hop URLLC in accordance with aspects of the present disclosure. In some examples, wireless communications system 200 may implement aspects of wireless communication system 100. In some aspects, wireless communications system 200 may include multi-hop communications between base station 105-c, relay UE 115-c and target UE 115-d. In addition, base station 105-c and 105-d, relay UE 115-c and target UE 115-d may each be examples of base stations 105 and UEs 115 as described with reference to FIG. 1.

Some wireless communications systems may be configured according to a number of different performance targets, such as those that support ultra-reliable low latency (URLLC) communications. In some examples, a wireless communications system may support automation applications (e.g., factory automation) in which data packets may be transmitted according to a configured traffic cycle time ($T_{cycle}$). For example, in a packaging machine application, a packet may be generated every 1 ms (e.g., 1 ms cycle time), and the packet may be transmitted within the 1 ms time period. In such cases, the packet may be transmitted according to a given communications reliability (e.g., high reliability, 99.9999% reliability, etc.) and in some examples, the packet may be received without errors (e.g., in cases including a second transmission of the packet). In some cases, performance targets may be applied to a number of different UEs in the wireless communications system or to a given service area or cell. In some applications, for example, a performance target may be applied to 100 UEs in a 10 m×10 m×3 m location. In other cases, a performance target may be applied for a number of different UEs in a different service area.

A UE 115 may communicate with multiple base stations 105 or transmission-reception points (TRPs) in a wireless system. For example, a wireless communications system 100 may support multi-TRP communication such that base station 105-a (e.g., TRP 1) and base station 105-b (e.g., TRP2) may communicate directly with a target UE 115-b. In some cases, communications signaling between base stations 105-a and 105-b and target UE 115-b may be blocked by an interfering object 220 or some other interference or blockage in the network such that the target UE 115-b may not receive signals transmitted from either base station 105. The UE 115-b may transmit negative feedback (e.g., NACK) for transmissions from base stations 105-a and 105-b, and the network or other network device may determine a link blockage for the target UE 115-b based on a number (N) of consecutive NACKs associated with the links between the UE 115-b and base stations 105-a and 105-b.

In some cases, (e.g., link blockage cases between a serving base station 105 and a target UE 115), the network may identify a neighboring UE (e.g., UE 115-*a*) that may act as a relay or donor UE to relay communications from the serving base station to the target UE 115-*b*. In some cases, UEs that are part of a same group may be indicated as relay candidates for one another. For example, the UEs may send measurement reports to the base station 105-*a*, and the base station 105-*a* may group UEs based on certain parameters in the received measurement report (e.g., parameters such as reference signal received power (RSRP), best beam pairing with the base station, etc.). For example, two or more UEs may report the same or similar values for received power or the same best beam, and the base station 105-*a* may group the UEs.

For some applications (e.g., ultra-reliable low latency, high reliability applications), packets communicated between a base station 105 and a target UE (e.g., UE 115-*b*) may be transmitted and received within a cycle time (e.g., 1 ms, 0.5 ms, 2 ms, etc.), where the cycle time may be determined based on a network specification such as a latency specification. In cases where multi-hop communications occur between the base station 105-*a* and the target UE 115-*b*, the base station 105-*a* may transmit a message to a relay UE 115-*a*, and the relay UE 115-*a* may transmit the message to the target UE 115-*b*. The target UE 115-*b* may then transmit a feedback message (e.g., an ACK or NACK feedback message) to the relay UE 115-*a*, and the relay UE 115-*a* may send the feedback to the base station 105-*a*.

In such cases, however, the round-trip time for the message (e.g., the time between when the message is transmitted from the base station 105-*a* to when the base station 105-*a* receives the feedback message from the target UE 115-*b*) may take more than half of the cycle time, and retransmissions from the base station 105-*a* to the target UE 115-*b* may not be completed within the cycle time. For example, in cases where the target UE 115-*b* transmits a NACK or otherwise requests a retransmission for the message transmitted by the base station 105-*a*, the time for retransmission (e.g., using the donor UE 115-*a* in a multi-hop process) may exceed the cycle time for low latency.

In some examples, a single two-hop connection may occur during a 1 ms cycle time, including base station 105-*a* using UE 115-*a* as a relay or donor UE for transmissions addressed to UE 115-*b*. The round-trip time for the two-hop connection may include transmission and processing times between the base station 105-*a*, the donor UE 115-*a*, and the target UE 115-*b*. For example, the UE processing time for the transmission from the base station 105-*a* to the donor UE 115-*a* (e.g., N1") and the time for donor UE 115-*a* to the target UE 115-*b* (e.g., N1) may be a number of symbols (e.g., (N1, N1") may be 20 symbols, 180 microseconds).

Such processing time may include time for the UE 115-*a* to decode the received packet (e.g., receiving PDSCH from the base station 105-*a* and decoding associated CRC bits), checking that the packet is correctly received, and forwarding the packet (including the PDSCH) to the target UE 115-*b*. In addition, the donor UE 115-*a* may forward the received packet to the target UE 115-*b*. Once receiving the packet, the target UE 115-*b* may generate ACK/NACK feedback and transmit the feedback to the donor UE 115-*a* according to a processing time period N1. The donor UE 115-*a* may receive the feedback from the target UE 115-*b* and may forward the feedback to the base station 105-*a* during a time N3 (e.g., 42 symbols).

In such cases, the total round-trip time for transmitting the packet and receiving feedback may be expressed by an average transmission time between the base station 105-*a*, the donor UE 115-*a*, the target UE 115-*b* (including both longer UE processing time upon reception of PDSCH at the donor UE 115-*a*, and shorter UE processing time upon reception of feedback from the target UE 115-*b*). The total round-trip time may be N"+N1+N1'+N3, which may in some cases be a number of symbols (e.g., 92 symbols) in length, and may be longer than half of the indicated cycle time (e.g., 1 ms).

For some transmissions, the packet may be incorrectly received (or not received) by the target UE 115-*b*, and the UE 115-*b* may send a NACK to the donor UE 115-*a*. The donor UE 115-*a* may forward the NACK to the base station 105-*a*, but the base station 105-*a* may not retransmit the packet because the additional transmission may exceed the indicated cycle time (e.g., two 92 symbol periods may exceed the 1 ms cycle time). Retransmissions, however, may improve communications efficiency and accuracy in a wireless system, including multi-hop wireless systems. To support retransmissions in such multi-hop systems, the round-trip time for transmissions between devices in a system may be reduced (e.g., to half the cycle time or less) so that at least a transmission and a retransmission may occur within a given traffic cycle.

In some cases, donor UE 115-*a* may detect at an early stage that a packet or transport block is addressed to the target UE 115-*b*, and the donor UE 115-*a* may forward the packet to the target UE 115-*b* without fully decoding the packet. For example, the donor UE 115-*a* may decode only a portion of the packet. In some cases, the donor UE 115-*a* may identify different RNTI scrambling codes for packets addressed to itself (e.g., the donor UE 115-*a*) and for packets addressed to the target UE 115-*b*. Accordingly, the donor UE 115-*a* may determine that an RNTI scrambling code associated with the target UE 115-*b* is different from the RNTI scrambling code associated with itself (e.g., the donor UE 115-*a*), and the donor UE 115-*a* may act as a repeater (e.g., the donor UE 115-*b* may retransmit the packet to the target UE 115-*b* without fully decoding the packet) based on the RNTI code associated with the target UE 115-*b*.

By acting as a repeater, the donor UE 115-*a* may stop or pause baseband processing upon PDCCH decoding and PDSCH delimitation (e.g., the donor UE 115-*a* may not decode the entire PDSCH for a packet addressed to the target UE 115-*b*). In addition, the donor UE 115-*a* may set a limit for a number of bits to send to the target UE 115-*b* (e.g., limiting the buffer size). In some cases, the donor UE 115-*a* may save I, Q symbols associated with the packet (e.g., where I is associated with an in-phase component of the received signal waveform, and Q is associated with the quadrature component). The UE may then forward the I, Q symbols to the target UE 115-*b*.

In some other cases, an indication transmitted with the PDCCH (e.g., a 1-bit indication) may notify the donor UE 115-*a* whether a packet transmitted with the current PDSCH is addressed to the target UE 115-*b* or to the donor UE 115-*a*. In some cases, this kind of indication may be implemented as explicit signaling (e.g., hard coded layer-1 signaling), and may allow the donor UE 115-*a* to determine at an early stage whether the packet is addressed to itself or to the target UE 115-*b*. For example, if the donor UE 115-*a* receives an indication in the PDCCH that a packet is addressed to the target UE 115-*b*, the donor UE may act as a repeater and may forward the packet to the target UE 115-*b* without decoding the packet.

In some cases, the network may include code block group (CBG) interlaced transmissions between the base station 105-*a* and the UEs 115. The total delay of the interlaced transmissions may be expressed by the following:

$$TotalDelay_{SingleHop} = t_{TransportBlock} + UEProcessingDelay_{targetUE} \quad (1)$$

$$TotalDelay_{2Hops} = t_{TransportBlock} + \quad (2)$$
$$UEProcessingDelay_{donorUE} + t_{transportBlock} + UEProcessingDelay_{targetUE}$$

$$TotalDelay_{2Hops} = 2 \cdot t_{TransportBlock} + \quad (3)$$
$$UEProcessingDelay_{donorUE} + UEProcessingDelay_{targetUE}$$
$$(\text{If } UEProcessingDelay_{donorUE} = UEProcessingDelay_{targetUE})$$

$$TotalDelay_{2Hops}^{CbgInterlacing} = (N+2) \cdot \left(\frac{t_{TransportBlock}}{N}\right) + \quad (4)$$
$$(N \cdot UEProcseeingDelay_{donorUE}) + UEProcessingDelay_{targetUE}$$

$$TotalDelay_{2Hops}^{CbgInterlacing} < TotalDelay_{2Hops} \quad (5)$$

$$\text{If } \left(\frac{2}{N} - 1\right) \cdot t_{TransportBlock} + (N-1) \cdot UEProcessingDelay_{donorUE} < 0 \quad (6)$$

The inequality in step (6) may be satisfied in cases where $t_{TransportBlock}$ and N are large. In addition, the inequality may be satisfied as $t_{TransportBlock}$ decreases in hops based on improved channel conditions.

In some aspects, the donor UE 115-a may be configured to support URLLC communications, for example, the donor UE 115-a may indicate (e.g., to the base station 105-a, to the target UE 115-b) that it has a capability to support packet forwarding without full PDSCH decoding. In addition, the donor UE 115-a may indicate that it may use early detection using the different RNTI scrambling codes or by an indication included in a PDCCH (e.g., the donor UE 115-a indicates that it may not implement an entire receiver processing chain).

Figure 3:
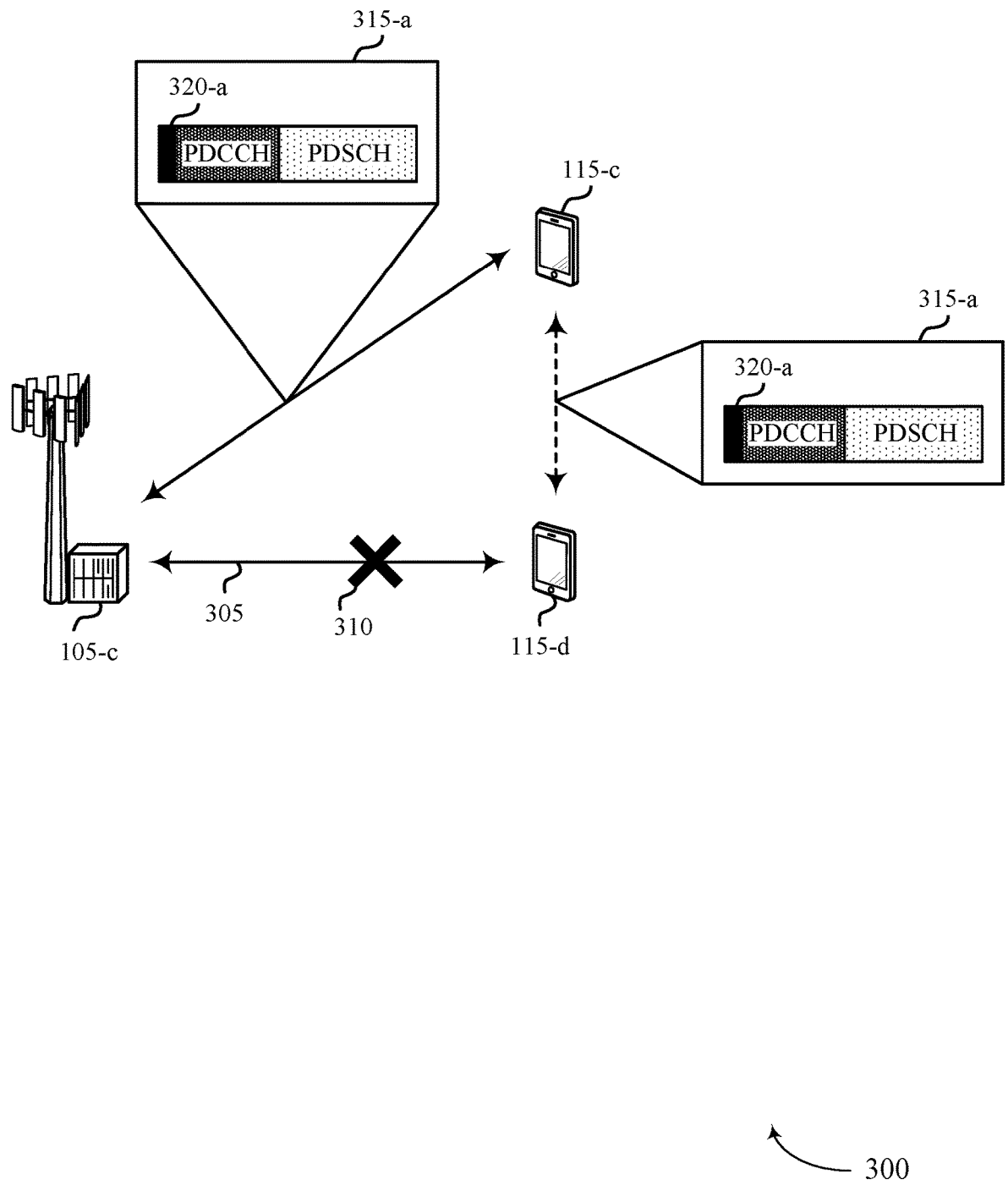
FIG. 3 illustrates an example of a wireless communications system that supports early detection of forwarding for multi-hop ultra-reliable low latency communications in accordance with aspects of the present disclosure.

FIG. 3 illustrates an example of a wireless communications system 300 that supports early detection of forwarding for multi-hop URLLC in accordance with aspects of the present disclosure. In some examples, wireless communications system 300 may implement aspects of wireless communication system 100. In some aspects, wireless communications system 300 may include multi-hop communications between base station 105-c, relay UE 115-c and target UE 115-d, which may be examples of base stations 105 and UEs 115 as described with reference to FIGS. 1 and 2.

In some cases, a base station 105-c may transmit a packet 315 to a donor UE 115-d using communication link 305. Communication link 305, however, may experience a blockage 310 or some other signal interference such that the target UE 115-d may not receive the packet 315 from the base station 105-c. The base station 105-c may use various beam blocking detection methods to determine whether to use a donor UE (such as UE 115-c) to relay the packet 315 to the target UE 115-c. For example, the base station 105-c may receive NACKs from the target UE 115-d or may not receive a response from the target UE 115-d which may indicate blockage of some type. In such cases, the base station 105-c may identify a donor UE 115-c that may relay the packet 315-a to the target UE 115-d, to avoid the signal blockage 310. In some cases, the donor UE 115-c may be configured to support forwarding the packet 315-a without fully decoding the packet 315-a, and the UE 115-c may notify the base station 105-c and the target UE 115-d that it has a forwarding capability. In some other cases, the base station 105-c may notify UE 115-c that it (UE 115-c) may act as a donor to forward packets to the target UE 115-d without fully decoding the packet.

In some cases, the donor UE 115-c and target UE 115-d may be indicated as part of a same UE group. In some other cases, the target UE 115-d may determine a set of candidate donor UEs and may notify the base station 105-c of the group of donor candidates or a single donor candidate to use. The base station 105-c may establish a number of radio access bearers (e.g., two radio access bearers) for the target UE 115-d and donor UE 115-c. The radio access bearers may be established throughout an RRC connection between target UE 115-d and the base station 105-c. In some cases, a direct connection may be established between the donor UE 115-c and the target UE 115-d.

The base station 105-c may transmit packet 315-a (e.g., a URLLC packet) to the donor UE 115-c. The packet 315-a may include an identification portion 320-a, which the donor UE 115-c may use to determine whether the packet 315-a is addressed to itself or whether the packet 315-a is addressed to the target UE 115-d. In some examples, the identification portion 320-a may be an RNTI scrambling code associated with the donor UE 115-c, or with the target UE 115-d. In cases where the packet 315-a is addressed to the target UE 115-d, the donor UE 115-c may identify the RNTI code as associated with the target UE 115-d, and may forward the packet 315-a to the target UE 115-d without decoding the PDSCH.

In some other examples, the identification portion 320-a may be an identifier (e.g., a 1-bit identifier) in the PDCCH which indicates whether the current packet transmitted with the current PDSCH is addressed to the donor UE 115-c, or whether it is addressed to the target UE 115-d. In such cases, the donor UE 115-c may detect explicit signaling (e.g., layer 1 (L1) explicit signaling) which the donor UE 115-c may use to detect at an early stage whether the packet 315-a may be forwarded to the target without full PDSCH decoding.

In some other examples, the identification portion 320-a may include a different identifier which the donor UE 115-c may use to early-detect that the packet 315-a is addressed to the target UE 115-d. The identifier may also include an indication of an ability to forward the packet 315-a to the target UE 115-d without fully decoding the PDSCH.

The donor UE 115-c may be previously aware of the RNTI code or other packet identifiers associated with packets that may be sent to the target UE 115-d. Then, rather than going through an entire decoding procedure (e.g., in which the donor UE 115-c may implement to receive other packets addressed to itself), the donor UE 115-c may identify the packet 315-a as addressed to the target UE 115-d, and may act as a repeater by retransmitting the packet 315-a to the target UE 115-d. In some cases, the donor UE 115-c may notify the target UE 115-d that it has a URLLC packet to send, and/or that the UEs may participate in URLLC communications.

According to various aspects, communications latency and round-trip time for the packet 315-a may be decreased in cases where the donor UE 115-c forwards the packet 315-a to the target UE 115-d without fully decoding the PDSCH. For example, UE processing time at the UE 115-c may be decreased because the donor UE 115-c no longer decodes the full packet 315-a upon receipt from the base station 105-c. In some cases, the target UE 115-d may receive the packet 315-a, and may transmit feedback to the target UE 115-c (e.g., ACK, NACK, etc.), and the donor UE 115-c may forward the feedback to the base station 105-c. In some examples, the round-trip time for the packet 315-a (e.g., from the base station 105-c transmitting the packet 315-a to the base station 105-c receiving feedback) may be less than or equal to one half of the cycle time for transmissions in the network (e.g., 0.5 ms, 56 slots for subcarrier spacing of 120 kHz for 1 ms traffic cycle). Accordingly, in cases where the target UE 115-*d* transmits a NACK for the packet 315-*a*, the base station 105-*c* may retransmit the packet 315-*a* within the allotted cycle time.

In some other aspects, the base station 105-*c* may determine that a round-trip time for communications using the donor UE 115-*c* may not be sufficiently reduced, and the base station 105-*c* may determine to not use the donor UE 115-*c* for relaying communications to the target UE 115-*d*.

Wireless communications system 300 may implement beam separation for communications between the base station 105-*c*, the donor UE 115-*c*, and the target UE 115-*d* (e.g., for different hops). For example, a first beam (e.g., beam 1) may be used for communications between the base station 105-*c* and the target UE 115-*d*, a second beam (e.g., beam 2) may be used for communications between the base station 105-*c* and the donor UE 115-*c*, and a third beam (e.g., beam 3) may be used for a direct connection between the donor UE 115-*c* and the target UE 115-*d*.

Such beam separation (e.g., between beam 1, beam 2, and beam 3) may occur in cases where the beam between the base station 105-*c* and the target UE 115-*d* (beam 1) and the beam between base station 105-*c* and the donor UE 115-*c* (beam 2) are different. Additionally, or alternatively, beam separation (e.g., between beam 1 and beam 3) may occur in cases where the beam between the base station 105-*c* and the target UE 115-*d* (beam 1) and the beam between base station 105-*c* and the donor UE 115-*c* (beam 2) are the same. In some other examples, a same waveform may be used for both links between the donor UE 115-*c*, the target UE 115-*d* and the base station 105-*c*, and for the direct link between the target UE 115-*d* and the donor UE 115-*c*.

For some communications between the donor UE 115-*c* and the target UE 115-*d*, the network may account for physical sidelink shared channel (PSSCH) preparation time in addition to physical sidelink control channel (PSCCH) preparation time (e.g., similar to physical uplink shared channel (PUSCH) preparation time). In some cases, the PSSCH and the PSCCH may be prepared ahead of time (e.g., before the UE 115-*c* receives the packet 315-*a*).

In some other cases, UE transmitter hardware at UEs 115-*c* and 115-*d* may process I, Q symbols (e.g., in addition to, or instead of bits). For example, the donor UE 115-*c* may save the I, Q symbols and may forward the symbols to the target UE 115-*d*. In some examples, the I, Q symbols may refer to common information (e.g., phase and quadrature information), and may be associated with a common waveform for both donor UE 115-*c* and target UE 115-*d* to base station links. A UE may store I, Q symbols in buffers, where the size of the buffer may be based on how much information is stored on existing buffers.

In addition, there may be a direct bus between transmitter and receiver buffers for the donor and target UEs. In some cases, the direct bus may be a direct link between the receiver (e.g., the target UE 115-*d*) and the transmitter (e.g., the donor UE 115-*c*), which may allow the PUSCH to be prepared upon reception of the packet 315-*a* that may be forwarded to the target UE 115-*d*. Further, the donor UE 115-*c* may support multi-panel transmission and reception such that the donor UE 115-*c* may submit feedback to the base station 105-*c* at the same time it forwards a packet to the target UE 115-*d* (e.g., the donor UE 115-*c* may support simultaneous feedback and forwarding transmissions).

Figure 4:
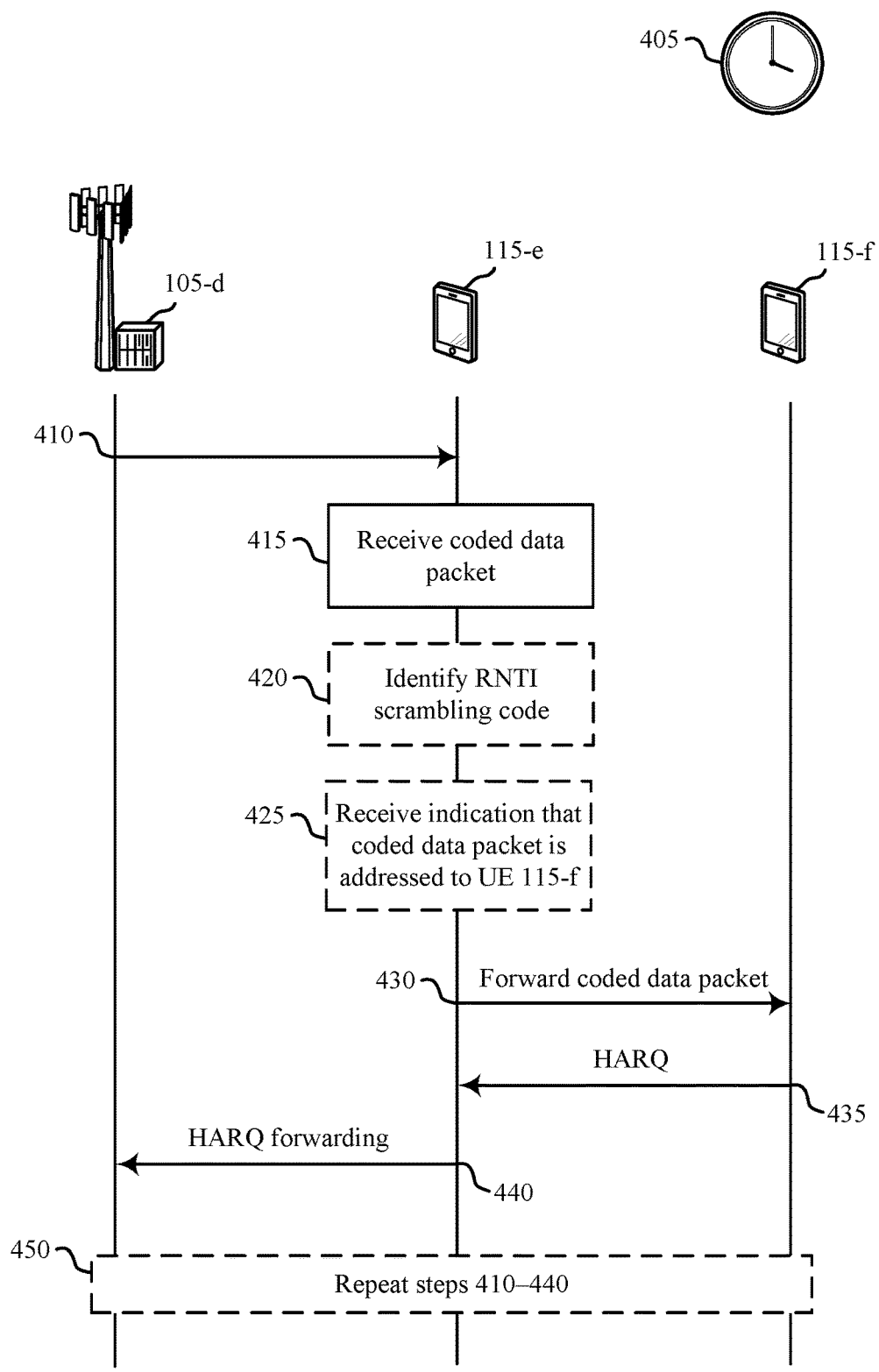
FIG. 4 illustrates an example of a process flow diagram that supports early detection of forwarding for multi-hop ultra-reliable low latency communications in accordance with aspects of the present disclosure.

FIG. 4 illustrates an example of a process flow diagram 400 that supports early detection of forwarding for multi-hop URLLC in accordance with aspects of the present disclosure. In some examples, process flow diagram 400 may implement aspects of wireless communication system 100. In some aspects, process flow diagram 400 may include multi-hop communications between base station 105-*d*, relay UE 115-*e* and target UE 115-*f*, which may be examples of base stations 105 and UEs 115 as described with reference to FIGS. 1 through 3.

At 405, a wireless communications network may identify a traffic cycle time (e.g., $T_{cycle}$) for communications according to various network configurations and/or communications targets. For example, communications between a first UE 115-*e* (e.g., a donor UE), a second UE 115-*f* (e.g., a target UE), and a base station (e.g., base station 105-*d*) may be configured according to a traffic cycle time of 1 ms. In some examples, the communications between base station 105-*d* and UEs 115-*e* and 115-*f* may be configured for low latency (e.g., URLLC) communications.

At 410, base station 105-*d* may transmit a coded data packet to a first UE 115-*e*, and at 415 the first UE 115-*e* (e.g., the donor UE) may receive the coded data packet from the base station 105-*d*. In some examples, the first UE 115-*e* may receive the coded data packet in a millimeter wave (e.g., mmW, FR2) frequency band.

In some cases, the first UE 115-*e* may identify that it may support a capability to forward the coded data packet without decoding at least a portion of the coded data packet. In some cases, the first UE 115-*e* may signal a capability notification to the second UE 115-*f*, which may notify the second UE 115-*f* of the capability. In some other cases, the first UE 115-*e* may not signal a capability notification to the second UE 115-*f*.

In some examples, such as at 420, the first UE 115-*e* may identify a RNTI scrambling code for data packets associated with the second UE 115-*f* (e.g., the target UE). In some cases, the first UE 115-*e* may decode at least a portion of the coded packet based on the RNTI scrambling code for data packets associated with the second UE 115-*f*. In some other cases, the first UE 115-*e* may refrain from decoding at least a portion of the coded packet based on the RNTI scrambling code.

In some cases, the RNTI scrambling code for packets associated with the second UE 115-*f* may be different from another RNTI scrambling code associated with the first UE 115-*e*. For example, the first UE 115-*e* may identify that the RNTI scrambling code is associated with data packets addressed to itself (e.g., the first UE 115-*e*), and may decode the data packet. In other cases, the first UE 115-*e* may identify that the RNTI scrambling code is associated with data packets addressed to the second UE 115-*f*, and the first UE 115-*e* may refrain from decoding at least a portion of the packet.

In some other examples, such as at 425, the first UE 115-*e* may receive an indication that the coded data packet is addressed to the second UE 115-*f*. In some aspects, the indication may be a 1-bit PDCCH indicator. In some other aspects, the indication may be a different control channel indicator.

At 430, the first UE 115-*e* may identify an established RRC connection between the second UE 115-*f* and the base station 105-*d*. In addition, the first UE 115-*e* may identify a radio bearer configured by the base station, and may establish a link between the base station 105-*d*, the first UE 115-*e*, the second UE 115-*f*, or any combination thereof based on the identified radio bearer. In some cases, the radio bearer may be established for URLLC communications in the network. In addition, the first UE 115-*e* and the second UE 115-f may be part of a group of UEs (e.g., a group of UEs which may be designated for multi-hop communications).

At 430, the first UE 115-e may forward the coded data packet to the second UE 115-f. In some cases, the first UE 115-e may forward the coded data packet based on the RNTI scrambling code. In some other cases, the first UE 115-e may forward the coded data packet based on the indication that the coded data packet is addressed to the second UE 115-f. The first UE 115-e may transmit an indication of the data packet to the second UE 115-f (e.g., the first UE 115-e may transmit the indication before sending the data packet). In some aspects, the first UE 115-e may be a repeater for data packets transmitted from the base station 105-d to the second UE 115-f. For example, the first UE 115-e may retransmit the coded data packet (sent from the base station 105-d) to the second UE 115-f.

At 435, the first UE 115-e may receive a HARQ message transmitted from the second UE 115-f in response to the coded data packet. The HARQ message may be a negative acknowledgement (NACK), a positive acknowledgement (ACK), or another feedback message associated with the coded data packet transmitted from the first UE 115-e.

At 440, the first UE 115-e may forward the HARQ message received from the second UE 115-f to the base station 105-d. In some cases, the first UE 115-e may receive a second coded data packet (e.g., associated with the second UE 115-f) from the base station 105-d, and may forward the second coded data packet to the second UE 115-f at a first time. In such cases, the first UE 115-e may forward the HARQ message to the base station 105-d at a second time simultaneous with the first time. For example, the first UE 115-e may forward the second coded data packet to the second UE 115-f at the same time it forwards the HARQ message to the base station 105-d.

In some cases, the HARQ message may be a NACK or may otherwise be a retransmission request sent from the second UE 115-f. At 450, the first UE 115-e may receive a retransmission of the coded data packet from the base station. In such cases, steps 410-440 of process flow diagram 400 may be repeated for the retransmission of the coded data packet. For example, the first UE 115-e may determine that the retransmission of the coded data packet includes an RNTI scrambling code for data packets associated with the second UE 115-f, and may forward the retransmission to the second UE 115-f based on the RNTI scrambling code.

Using the techniques described herein, a multi-hop transmission of the coded data packet and a multi-hop retransmission of the coded data packet may be performed within the configured cycle time 405. In some cases, the cycle time may be configured to support low latency communications.

Figure 5:
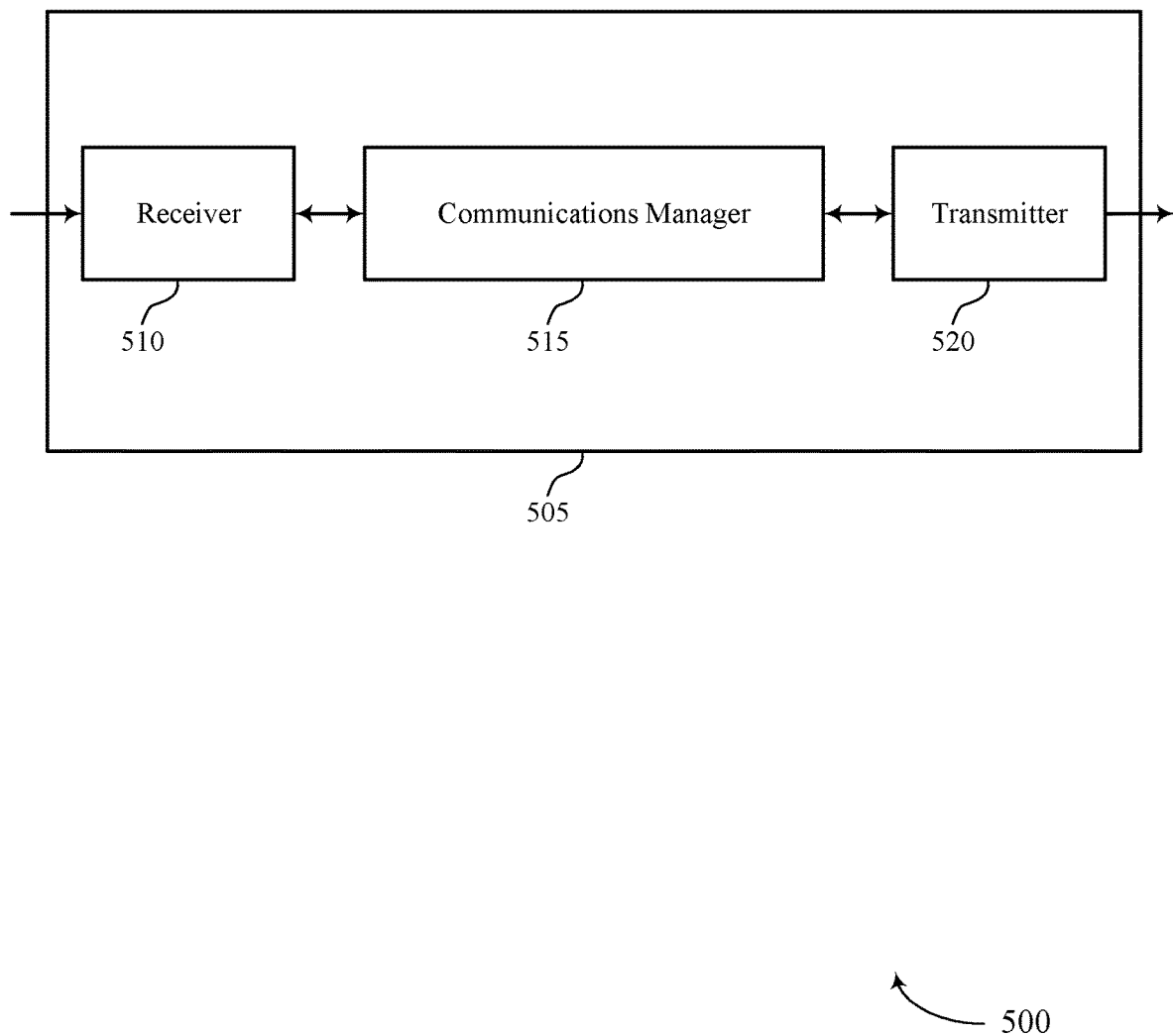
FIGS. 5 and 6 show block diagrams of devices that support early detection of forwarding for multi-hop ultra-reliable low latency communications in accordance with aspects of the present disclosure.

FIG. 5 shows a block diagram 500 of a device 505 that supports early detection of forwarding for multi-hop URLLC in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to early detection of forwarding for multi-hop URLLC, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a coded data packet from a base station in a millimeter wave frequency band and forward the coded data packet to a second UE based on a RNTI scrambling code for data packets associated with the second UE. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, communications manager 515 may be implemented as an integrated circuit or chipset for a mobile device modem, and the receiver 510 and transmitter 520 may be implemented as analog components (e.g., amplifiers, filters, antennas, etc.) coupled with the mobile device modem to enable wireless transmission and reception.

The communications manager 515 as described herein may be implemented to realize one or more potential advantages. Various implementations may enable. At least one implementation may enable early detection for forwarding data packets for multi-hop communications in a wireless communications network implementing low latency communications. At least one implementation may enable communications manager 515 to increase communications efficiency in the wireless network by allowing for error correction using retransmissions. At least one implementation may enable communications manager 515 to detect at an early stage that a coded data packet is addressed to a different device, and the communications manager 515 may refrain from decoding the coded data packet based on the early detection.

Based on implementing the early detection and packet forwarding techniques as described herein, one or more processors of the device 505 (e.g., processor(s) controlling or incorporated with one or more of receiver 510, communications manager 515, and transmitter 520) may allow for the wireless system to be more robust against transmission error and link inaccuracies. In addition, the early detection and packet forwarding techniques may reduce processing power and increase power savings at the donor UE, which may decode a smaller portion of the packet (e.g., rather than decoding the PDCCH entirely).

Figure 6:
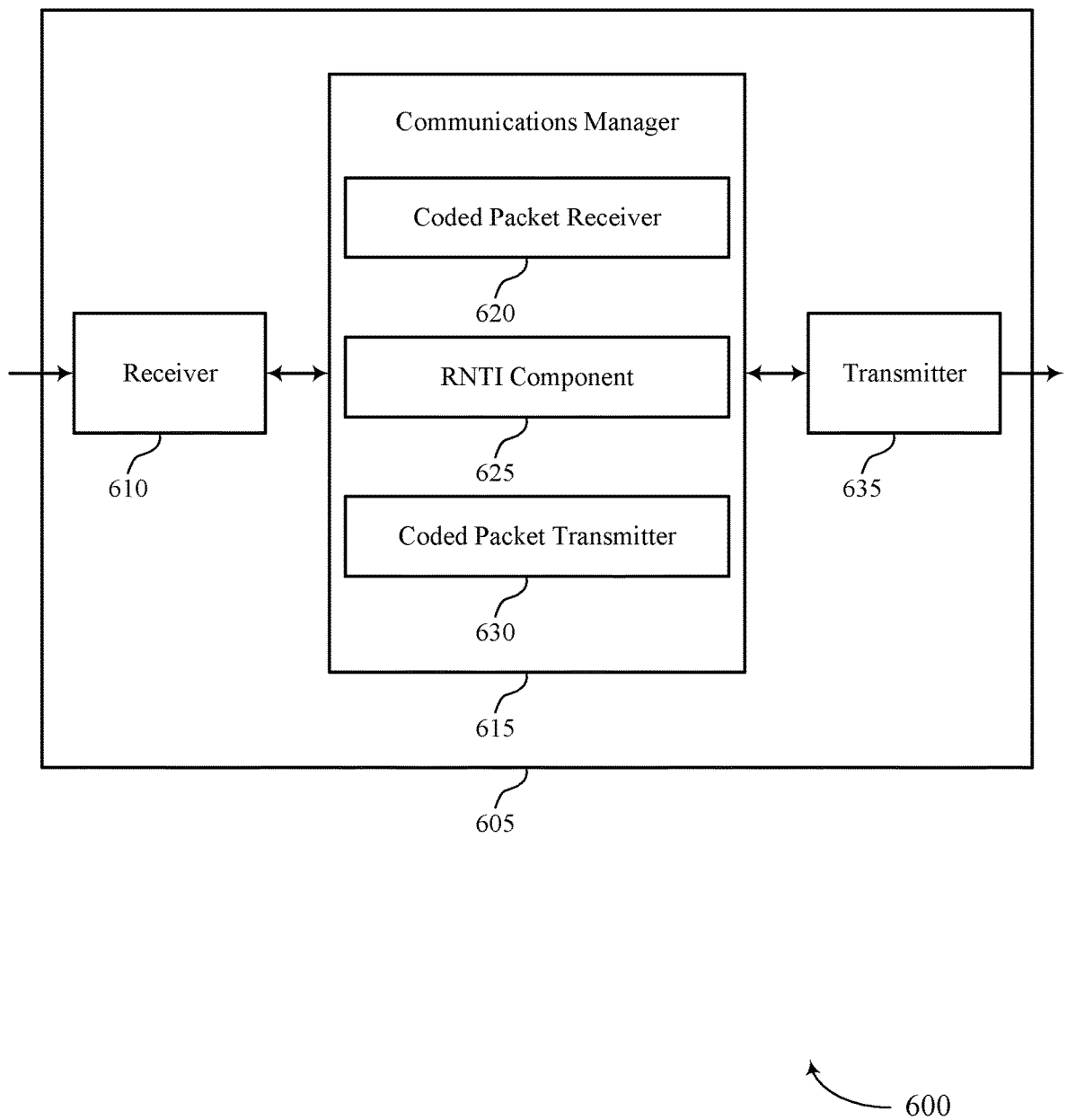

FIG. 6 shows a block diagram 600 of a device 605 that supports early detection of forwarding for multi-hop URLLC in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to early detection of forwarding for multi-hop URLLC, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a coded packet receiver 620, a RNTI component 625, and a coded packet transmitter 630. The communications manager 615 may be an example of aspects of the communications manager 810 described herein.

The coded packet receiver 620 may receive a coded data packet from a base station in a millimeter wave frequency band. The RNTI component 625 may identify a RNTI scrambling code for data packets associated with a second UE. The coded packet transmitter 630 may forward the coded data packet to the second UE based on the RNTI scrambling code.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
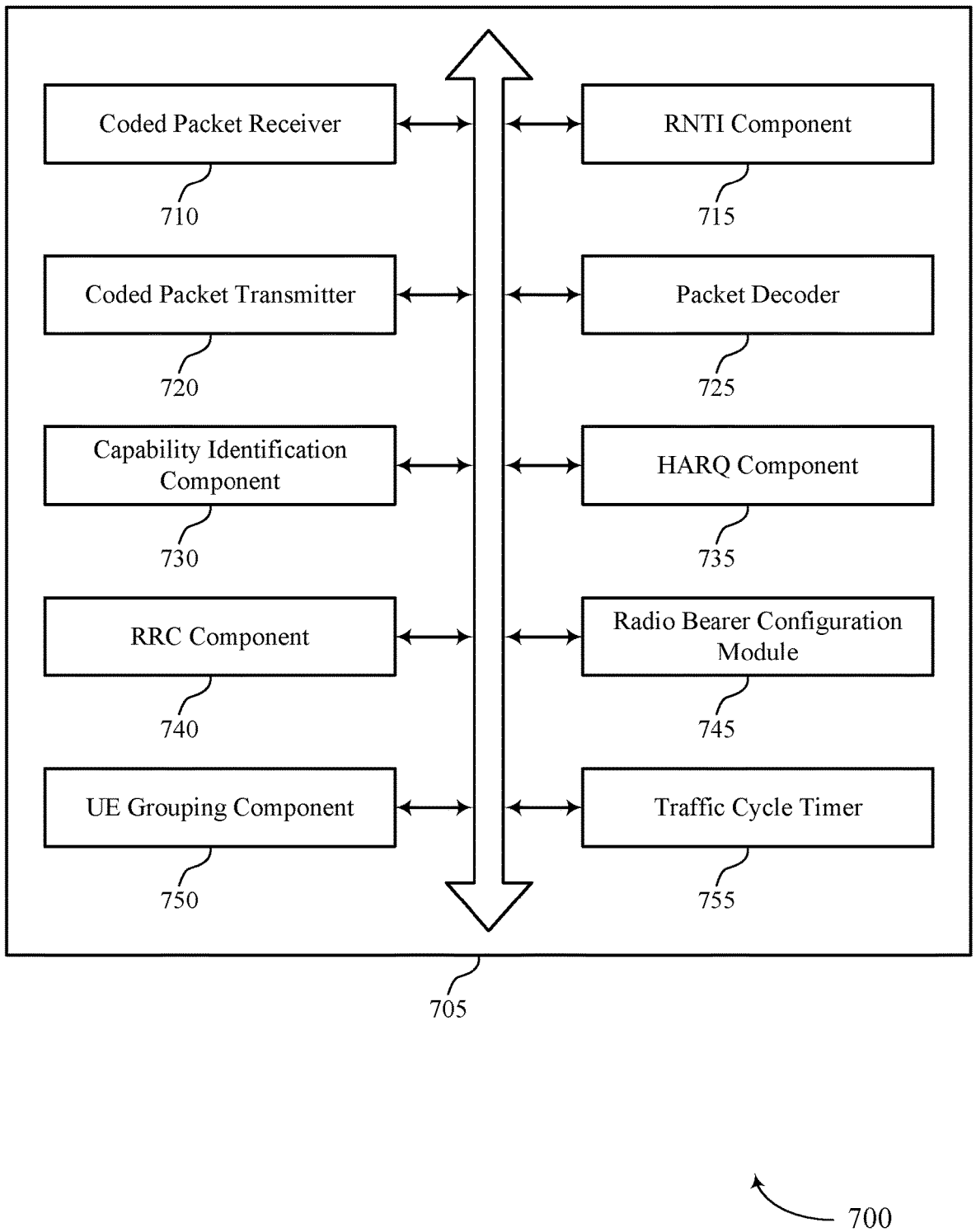
FIG. 7 shows a block diagram of a communications manager that supports early detection of forwarding for multi-hop ultra-reliable low latency communications in accordance with aspects of the present disclosure.

FIG. 7 shows a block diagram 700 of a communications manager 705 that supports early detection of forwarding for multi-hop URLLC in accordance with aspects of the present disclosure. The communications manager 705 may be an example of aspects of a communications manager 515, a communications manager 615, or a communications manager 810 described herein. The communications manager 705 may include a coded packet receiver 710, a RNTI component 715, a coded packet transmitter 720, a packet decoder 725, a capability identification component 730, a HARQ component 735, a RRC component 740, a radio bearer configuration module 745, a UE grouping component 750, and a traffic cycle timer 755. Each of these modules may communicate, directly or indirectly, with one another (e.g., via one or more buses).

The traffic cycle timer 755 may indicate a traffic cycle time for communications in the wireless network. In some cases, the communications between the first UE, the second UE, and the base station are configured according to a traffic cycle time.

The coded packet receiver 710 may receive a coded data packet from a base station in a millimeter wave frequency band. In some examples, the coded packet receiver 710 may receive an indication that the coded data packet is addressed to the second UE. In some cases, the indication includes a 1-bit physical downlink control channel indicator.

The UE grouping component 750 may identify a grouping of UE (e.g., for packet forwarding applications, etc.) In some cases, the first UE and the second UE include a group of UE.

The RRC component 740 may establish an RRC connection between the second UE and the base station. In some examples, the RRC component 740 may establish a link between the base station, the second UE, or a combination thereof based on the radio bearer. The radio bearer configuration module 745 may identify a radio bearer configured by the base station. In some cases, the radio bearer is established for URLLC.

The packet decoder 725 may decode at least a portion of the coded data packet based on the RNTI scrambling code for data packets associated with the second UE. In some other examples, the packet decoder 725 may decode the coded data packet.

The capability identification component 730 may identify that the first UE supports a capability to forward the coded data packet without decoding at least a portion of the coded data packet. In some examples, the capability identification component 730 may transmit a notification of the capability to the second UE.

The RNTI component 715 may identify a RNTI scrambling code for data packets associated with a second UE. In some examples, the RNTI component 715 may determine the retransmission includes a RNTI scrambling code for data packets associated with the second UE. In some other examples, the RNTI component 715 may identify the RNTI scrambling code for data packets associated with the first UE. In some cases, the RNTI scrambling code for data packets associated with the second UE is different from another RNTI scrambling code associated with the first UE.

In some examples, the coded packet transmitter 720 may transmit an indication of the data packet to the second UE.

In some examples, the coded packet transmitter 720 may forward the coded data packet to the second UE based on the indication. In some other examples, the coded packet transmitter 720 may forward the coded data packet to the second UE based on the RNTI scrambling code. In some cases, the first UE includes a repeater for data packets transmitted from the base station to the second UE.

The HARQ component 735 may receive a HARQ message from the second UE based on the coded data packet. In some examples, the HARQ component 735 may forward the HARQ message from the second UE to the base station. In some cases, the HARQ message includes a negative acknowledgement, a positive acknowledgement, or another feedback message.

In some examples, the coded packet receiver 710 may receive a second coded data packet from the base station. In some examples, the coded packet transmitter 720 may forward the second coded data packet to the second UE at a first time. In some examples, the HARQ component 735 may forward the HARQ message to the base station at a second time simultaneous with the first time.

In some examples, the coded packet receiver 710 may receive a retransmission of the coded data packet from the base station. In some examples, the coded packet transmitter 720 may forward the retransmission to the second UE based on the RNTI scrambling code.

Figure 8:
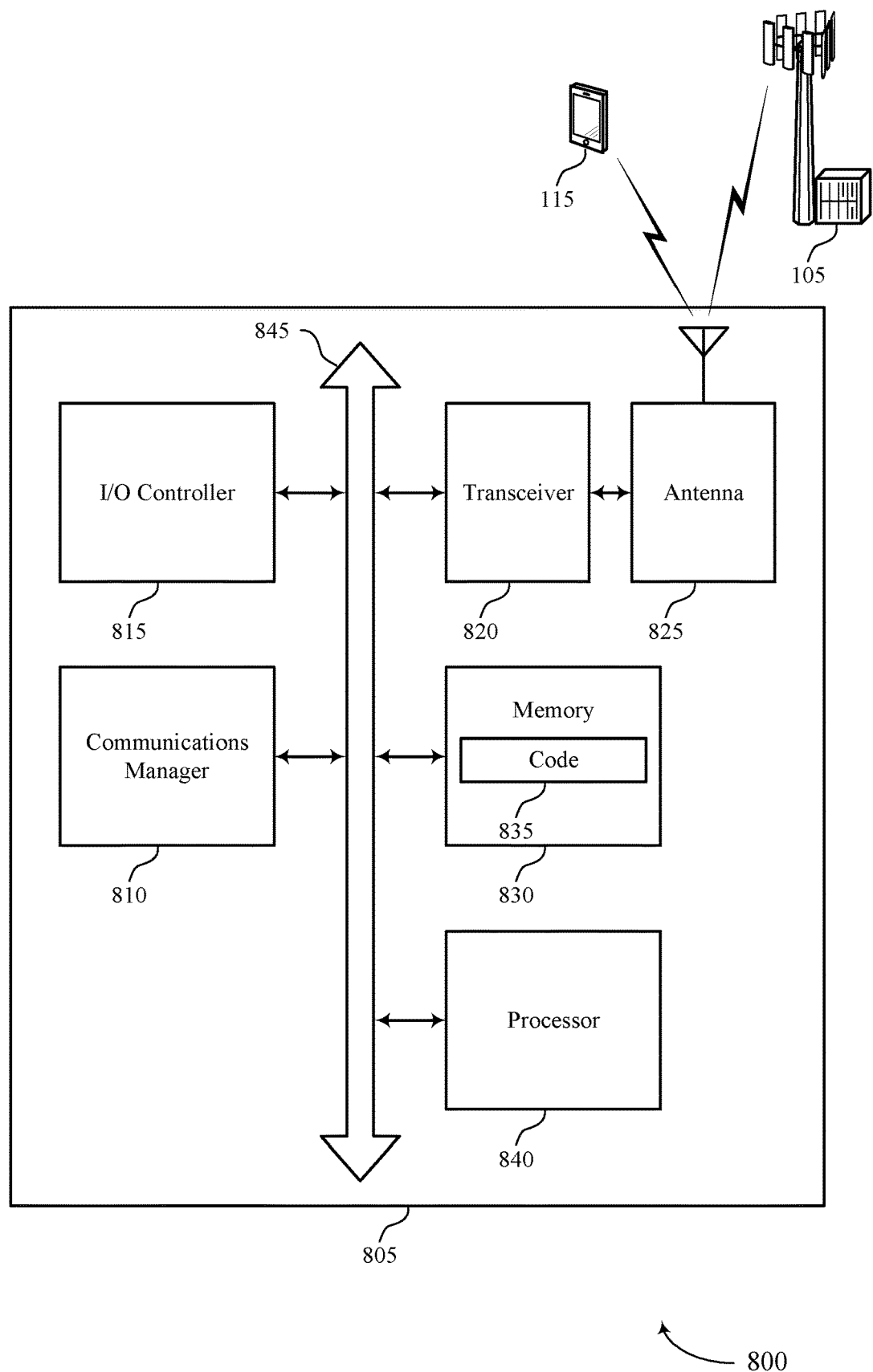
FIG. 8 shows a diagram of a system including a device that supports early detection of forwarding for multi-hop ultra-reliable low latency communications in accordance with aspects of the present disclosure.

FIG. 8 shows a diagram of a system 800 including a device 805 that supports early detection of forwarding for multi-hop URLLC in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a coded data packet from a base station in a millimeter wave frequency band, and forward the coded data packet to a second UE based on a RNTI scrambling code for data packets associated with the second UE.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting early detection of forwarding for multi-hop URLLC).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
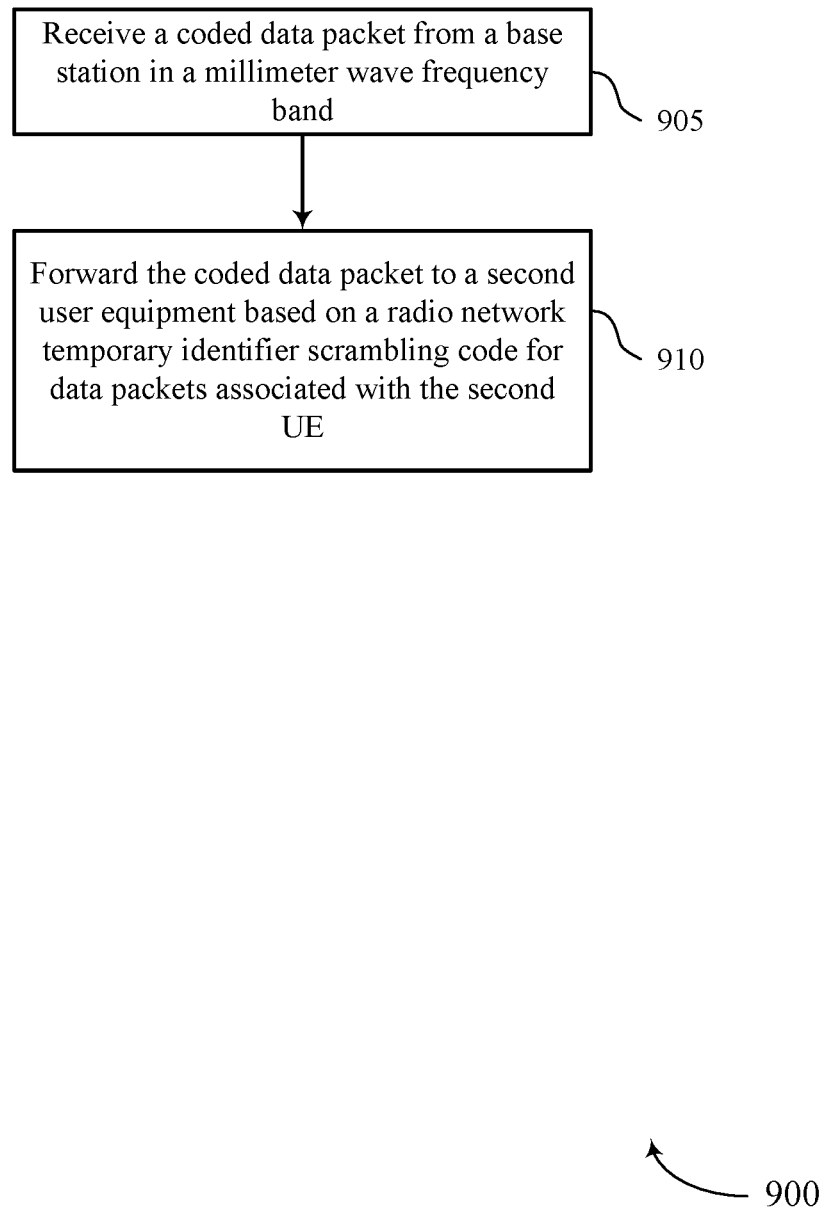
FIGS. 9 through 12 show flowcharts illustrating methods that support early detection of forwarding for multi-hop ultra-reliable low latency communications in accordance with aspects of the present disclosure.

FIG. 9 shows a flowchart illustrating a method 900 that supports early detection of forwarding for multi-hop URLLC in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein Additionally or alternatively, a UE may perform aspects of the functions described herein using special-purpose hardware.

At 905, the UE may receive a coded data packet from a base station in a millimeter wave frequency band. The operations of 905 may be performed according to the methods described herein. In some examples, aspects of the operations of 905 may be performed by a coded packet receiver as described with reference to FIGS. 5 through 8.

At 910, the UE may forward the coded data packet to a second UE based on a RNTI scrambling code for data packets associated with the second UE. The operations of 910 may be performed according to the methods described herein. In some examples, aspects of the operations of 910 may be performed by a RNTI component as described with reference to FIGS. 5 through 8.

Figure 10:
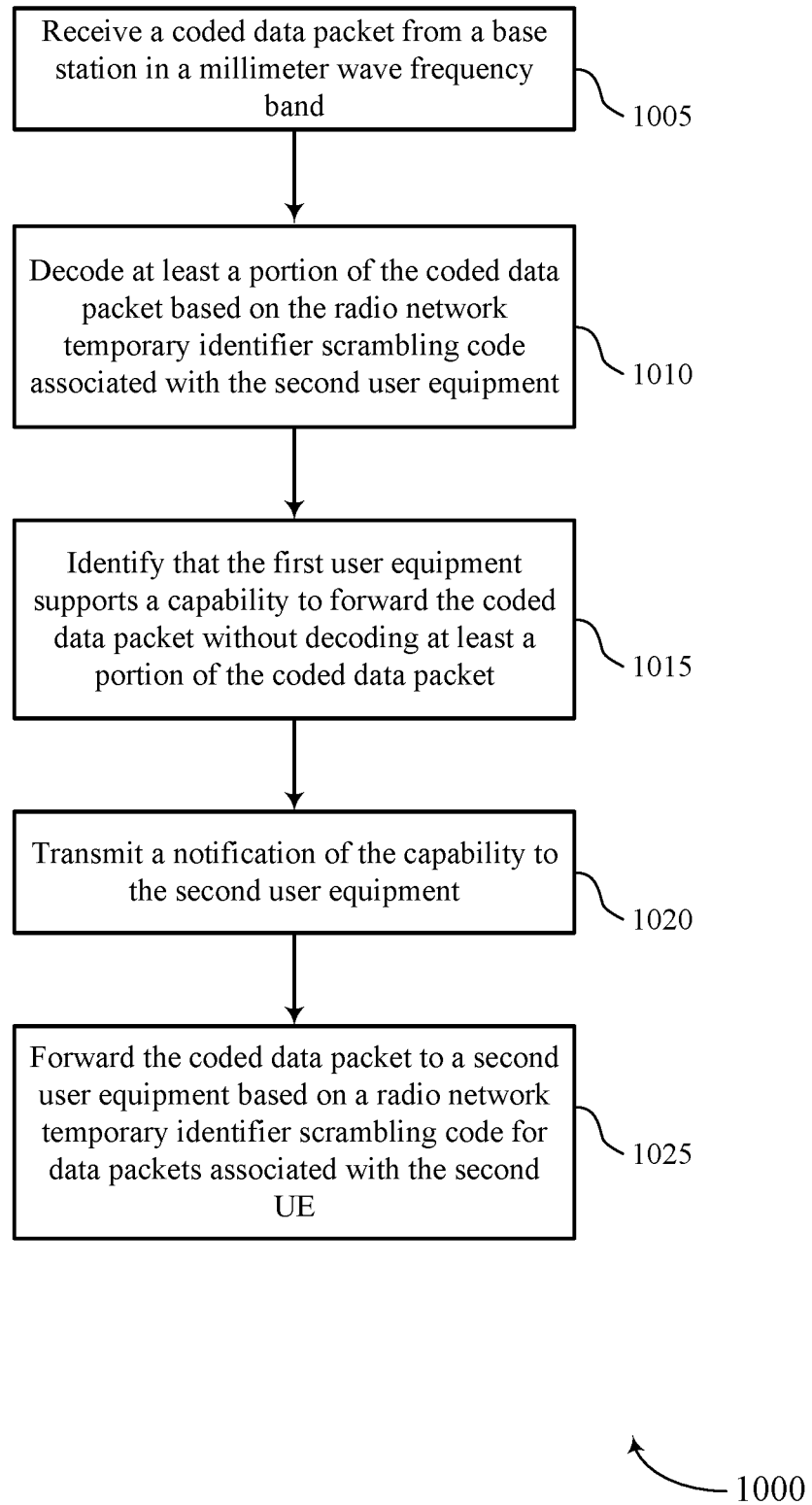

FIG. 10 shows a flowchart illustrating a method 1000 that supports early detection of forwarding for multi-hop URLLC in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein Additionally or alternatively, a UE may perform aspects of the functions described herein using special-purpose hardware.

At 1005, the UE may receive a coded data packet from a base station in a millimeter wave frequency band. The operations of 1005 may be performed according to the methods described herein. In some examples, aspects of the operations of 1005 may be performed by a coded packet receiver as described with reference to FIGS. 5 through 8.

At 1010, the UE may decode at least a portion of the coded data packet based on a RNTI scrambling code associated with a second UE. The operations of 1010 may be performed according to the methods described herein. In some examples, aspects of the operations of 1010 may be performed by a packet decoder as described with reference to FIGS. 5 through 8.

At 1015, the UE may identify that the first UE supports a capability to forward the coded data packet without decoding at least a portion of the coded data packet. The operations of 1015 may be performed according to the methods described herein. In some examples, aspects of the operations of 1015 may be performed by a capability identification component as described with reference to FIGS. 5 through 8.

At 1020, the UE may transmit a notification of the capability to the second UE. The operations of 1020 may be performed according to the methods described herein. In some examples, aspects of the operations of 1020 may be performed by a capability identification component as described with reference to FIGS. 5 through 8.

At 1025, the UE may forward the coded data packet to a second UE based on the RNTI scrambling code for data packets associated with the second UE. The operations of 1025 may be performed according to the methods described herein. In some examples, aspects of the operations of 1025 may be performed by a coded packet transmitter as described with reference to FIGS. 5 through 8.

Figure 11:
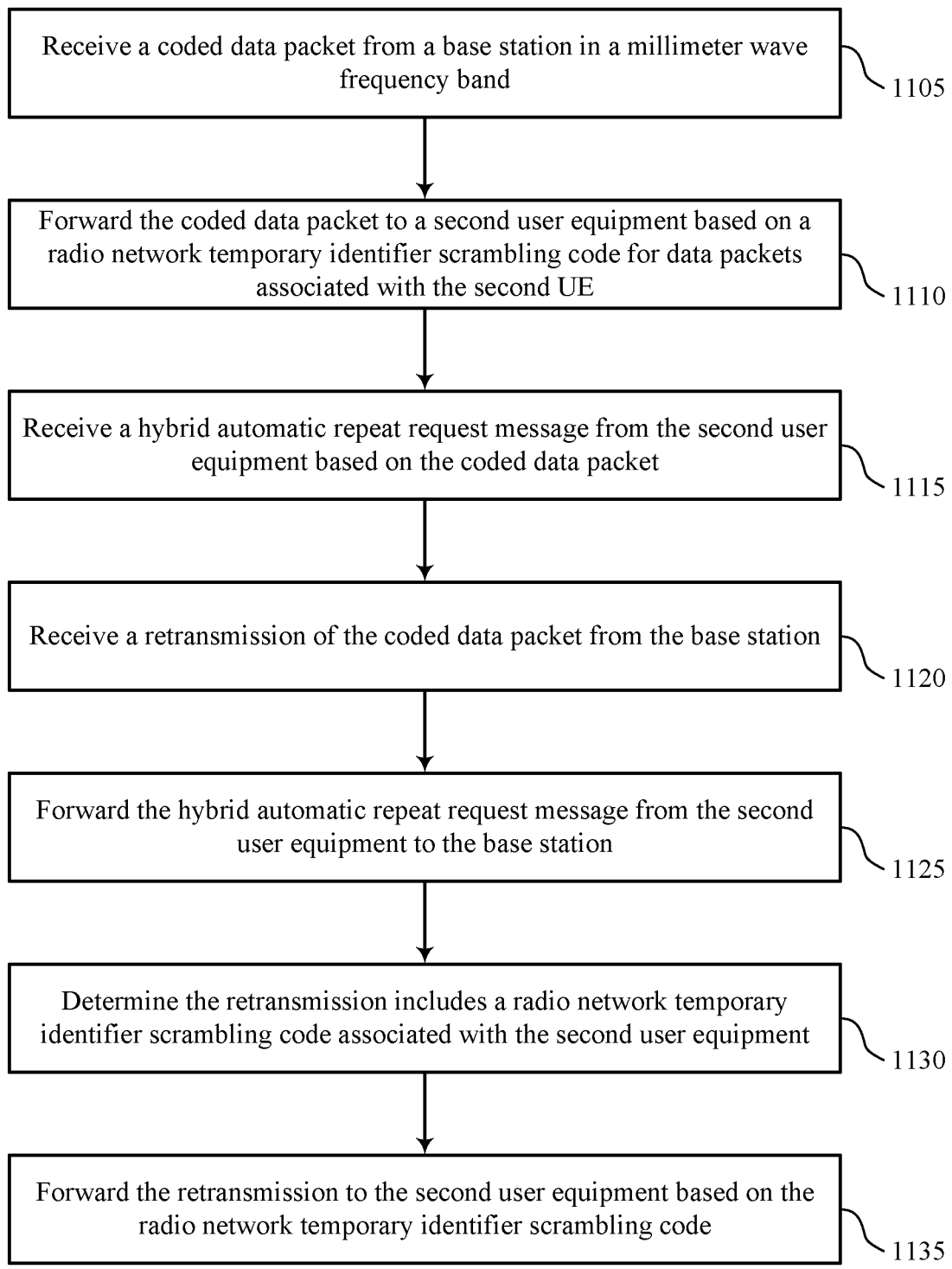

FIG. 11 shows a flowchart illustrating a method 1100 that supports early detection of forwarding for multi-hop URLLC in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may receive a coded data packet from a base station in a millimeter wave frequency band. The operations of 1105 may be performed according to the methods described herein. In some examples, aspects of the operations of 1105 may be performed by a coded packet receiver as described with reference to FIGS. 5 through 8.

At 1110, the UE may forward the coded data packet to a second UE based on a RNTI scrambling code for data packets associated with the second UE. The operations of 1110 may be performed according to the methods described herein. In some examples, aspects of the operations of 1110 may be performed by a coded packet transmitter as described with reference to FIGS. 5 through 8.

At 1115, the UE may receive a HARQ message from the second UE based on the coded data packet. The operations of 1115 may be performed according to the methods described herein. In some examples, aspects of the operations of 1115 may be performed by a HARQ component as described with reference to FIGS. 5 through 8.

At 1120, the UE may receive a retransmission of the coded data packet from the base station. The operations of 1120 may be performed according to the methods described herein. In some examples, aspects of the operations of 1120 may be performed by a coded packet receiver as described with reference to FIGS. 5 through 8.

At 1125, the UE may forward the HARQ message from the second UE to the base station. The operations of 1125 may be performed according to the methods described herein. In some examples, aspects of the operations of 1125 may be performed by a HARQ component as described with reference to FIGS. 5 through 8.

At 1130, the UE may determine the retransmission includes a RNTI scrambling code for data packets associated with the second UE. The operations of 1130 may be performed according to the methods described herein. In some examples, aspects of the operations of 1130 may be performed by a RNTI component as described with reference to FIGS. 5 through 8.

At 1135, the UE may forward the retransmission to the second UE based on the RNTI scrambling code. The operations of 1135 may be performed according to the methods described herein. In some examples, aspects of the operations of 1135 may be performed by a coded packet transmitter as described with reference to FIGS. 5 through 8.

Figure 12:
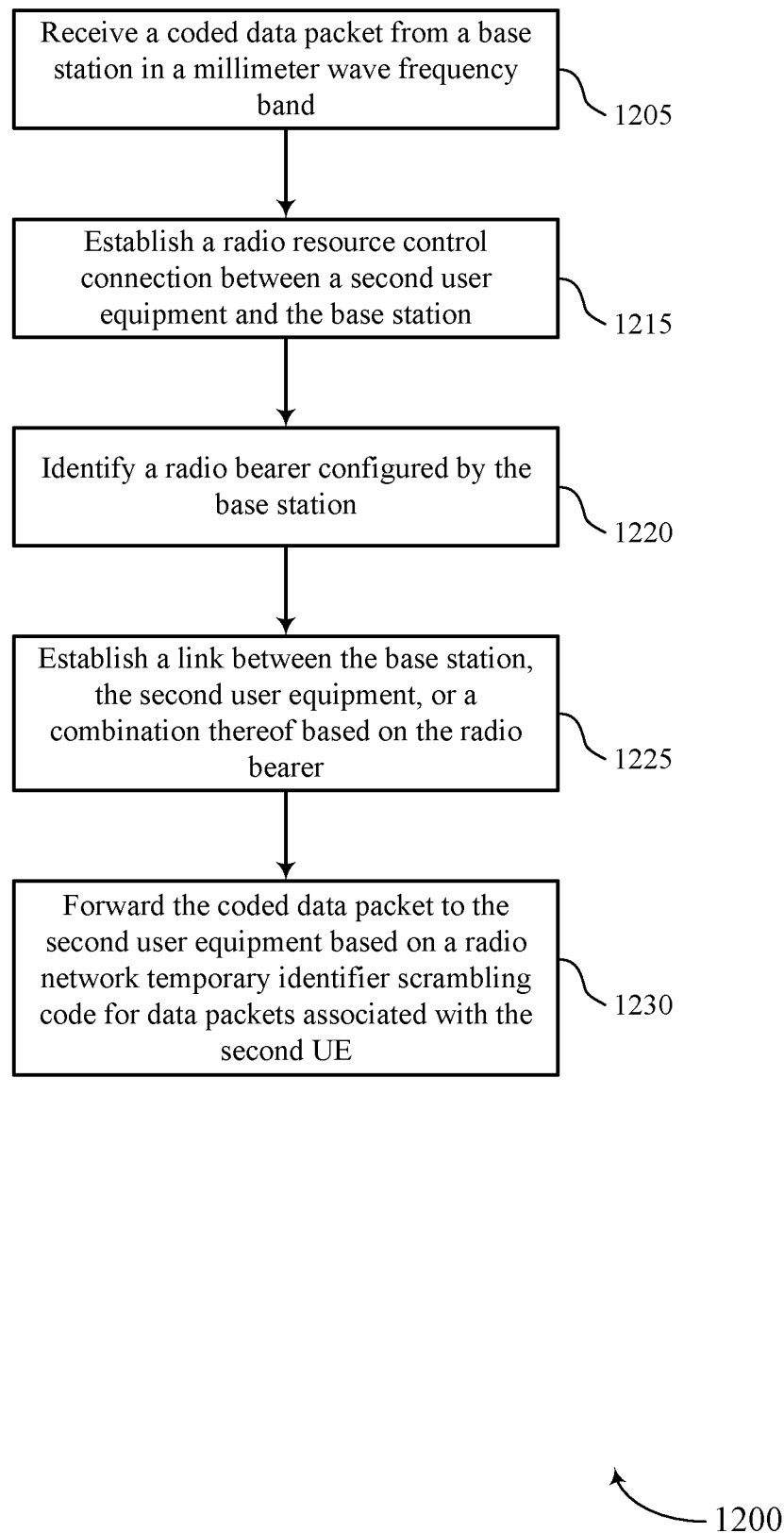

FIG. 12 shows a flowchart illustrating a method 1200 that supports early detection of forwarding for multi-hop URLLC in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the UE may receive a coded data packet from a base station in a millimeter wave frequency band. The operations of 1205 may be performed according to the methods described herein. In some examples, aspects of the operations of 1205 may be performed by a coded packet receiver as described with reference to FIGS. 5 through 8.

At 1210, the UE may establish an RRC between the second UE and the base station. The operations of 1210 may be performed according to the methods described herein. In some examples, aspects of the operations of 1210 may be performed by an RRC component as described with reference to FIGS. 5 through 8.

At 1215, the UE may identify a radio bearer configured by the base station. The operations of 1215 may be performed according to the methods described herein. In some examples, aspects of the operations of 1215 may be performed by a radio bearer configuration module as described with reference to FIGS. 5 through 8.

At 1220, the UE may establish a link between the base station, the second UE, or a combination thereof based on the radio bearer. The operations of 1220 may be performed according to the methods described herein. In some examples, aspects of the operations of 1220 may be performed by an RRC component as described with reference to FIGS. 5 through 8.

At 1225, the UE may forward the coded data packet to the second UE based on a RNTI scrambling code for data packets associated with the second UE. The operations of 1225 may be performed according to the methods described herein. In some examples, aspects of the operations of 1225 may be performed by a coded packet transmitter as described with reference to FIGS. 5 through 8.

SUMMARY OF ASPECTS

The following provides an overview of aspects of the present disclosure:

Aspect 1: A method for wireless communications at a first UE, comprising: receiving a coded data packet from a base station in a millimeter wave frequency band; and forwarding the coded data packet to a second UE based at least in part on a radio network temporary identifier scrambling code for data packets associated with the second UE.

Aspect 2: The method of aspect 1, wherein forwarding the coded data packet further comprises: decoding at least a portion of the coded data packet based at least in part on the radio network temporary identifier scrambling code associated with the second UE.

Aspect 3: The method of any of aspects 1 through 2, further comprising: identifying that the first UE supports a capability to forward the coded data packet without decoding at least a portion of the coded data packet; and transmitting a notification of the capability to the second UE.

Aspect 4: The method of any of aspects 1 through 3, further comprising: receiving an indication that the coded data packet is addressed to the second UE; and forwarding the coded data packet to the second UE based at least in part on the indication.

Aspect 5: The method of aspect 4, wherein the indication comprises a 1 bit physical downlink control channel indicator.

Aspect 6: The method of any of aspects 1 through 5, further comprising: receiving a hybrid automatic repeat request message from the second UE based at least in part on the coded data packet; and forwarding the hybrid automatic repeat request message from the second UE to the base station.

Aspect 7: The method of aspect 6, further comprising: receiving a second coded data packet from the base station; forwarding the second coded data packet to the second UE at a first time; and forwarding the hybrid automatic repeat request message to the base station at a second time simultaneous with the first time.

Aspect 8: The method of any of aspects 6 through 7, wherein the hybrid automatic repeat request message comprises a negative acknowledgement, a positive acknowledgement, or another feedback message.

Aspect 9: The method of any of aspects 1 through 8, further comprising: receiving a retransmission of the coded data packet from the base station; determining the retransmission includes the radio network temporary identifier scrambling code for data packets associated with the second UE; and forwarding the retransmission to the second UE based at least in part on the radio network temporary identifier scrambling code.

Aspect 10: The method of any of aspects 1 through 9, wherein the radio network temporary identifier scrambling code for data packets associated with the second UE is different from another radio network temporary identifier scrambling code for data packets associated with the first UE.

Aspect 11: The method of any of aspects 1 through 10, wherein identifying the radio network temporary identifier scrambling code further comprises: identifying the radio network temporary identifier scrambling code for data packets associated with the first UE; and decoding the coded data packet.

Aspect 12: The method of any of aspects 1 through 11, further comprising: establishing a radio resource control connection between the second UE and the base station; identifying a radio bearer configured by the base station; and establishing a link between the base station, the second UE, or a combination thereof based at least in part on the radio bearer.

Aspect 13: The method of aspect 12, wherein the radio bearer is established for ultra-reliable low latency communications.

Aspect 14: The method of any of aspects 1 through 13, wherein the first UE and the second UE comprise a group of UE.

Aspect 15: The method of any of aspects 1 through 14, further comprising: transmitting an indication of the coded data packet to the second UE.

Aspect 16: The method of any of aspects 1 through 15, wherein communications between the first UE, the second UE, and the base station are configured according to a traffic cycle time.

Aspect 17: The method of any of aspects 1 through 16, wherein the first UE comprises a repeater for data packets transmitted from the base station to the second UE.

Aspect 18: An apparatus for wireless communications at a first UE, comprising a processor; memory coupled with the processor; and instructions stored in the memory and executable by the processor to cause the apparatus to perform a method of any of aspects 1 through 17.

Aspect 19: An apparatus for wireless communications at a first UE, comprising at least one means for performing a method of any of aspects 1 through 17.

Aspect 20: A non-transitory computer-readable medium storing code for wireless communications at a first UE, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   transmitting, to a second UE, a capability notification, the capability notification indicating that the first UE is capable of forwarding, to the second UE, a coded data packet without the first UE decoding a data portion of the coded data packet;
   receiving the coded data packet from a base station in a millimeter wave frequency band;
   detecting a radio network temporary identifier scrambling code for the coded data packet, wherein the radio network temporary identifier scrambling code indicates that the coded data packet is addressed to the second UE; and
   forwarding the coded data packet to a second UE based at least in part on the detected radio network temporary identifier scrambling code.

2. The method of claim 1, wherein forwarding the coded data packet further comprises:
   decoding a header portion of the coded data packet based at least in part on the radio network temporary identifier scrambling code associated with the second UE.

3. The method of claim 1, wherein detecting the radio network temporary identifier scrambling code for the coded data packet comprises:
   detecting an indication that the coded data packet is addressed to the second UE in accordance with the radio network temporary identifier scrambling code.

4. The method of claim 3, wherein the indication comprises a 1-bit physical downlink control channel indicator.

5. The method of claim 1, further comprising:
   receiving a hybrid automatic repeat request message from the second UE based at least in part on the coded data packet; and
   forwarding the hybrid automatic repeat request message from the second UE to a network device.

6. The method of claim 5, further comprising:
   receiving a second coded data packet;
   forwarding the second coded data packet to the second UE at a first time; and
   forwarding the hybrid automatic repeat request message to the network device at a second time simultaneous with the first time.

7. The method of claim 5, wherein the hybrid automatic repeat request message comprises a negative acknowledgement, a positive acknowledgement, or another feedback message.

8. The method of claim 1, further comprising:
   receiving a retransmission of the coded data packet, wherein the retransmission includes the radio network temporary identifier scrambling code for data packets associated with the second UE; and
   forwarding the retransmission to the second UE based at least in part on the radio network temporary identifier scrambling code.

9. The method of claim 1, wherein the radio network temporary identifier scrambling code for data packets associated with the second UE is different from a second radio network temporary identifier scrambling code for data packets associated with the first UE.

10. The method of claim 1, further comprising:
   detecting a second radio network temporary identifier scrambling code for a second coded data packet, wherein the second radio network temporary identifier scrambling code indicates that the second coded data packet is addressed to the first UE; and
   decoding the second coded data packet based at least in part on the second radio network temporary identifier scrambling code.

11. The method of claim 1, further comprising:
   establishing a radio resource control connection between the second UE and a network device; and
   establishing a link between the network device, the second UE, or a combination thereof via a radio bearer configured by the network device.

12. The method of claim 11, wherein the radio bearer is established for ultra-reliable low latency communications.

13. The method of claim 1, wherein the first UE and the second UE comprise a group of UE.

14. The method of claim 1, further comprising:
   transmitting an indication of the coded data packet to the second UE.

15. The method of claim 1, wherein communications between the first UE, the second UE, and a network entity are configured according to a traffic cycle time.

16. The method of claim 1, wherein the first UE comprises a repeater for data packets addressed to the second UE.

17. An apparatus for wireless communications at a first user equipment (UE), comprising:
   at least one processor,
   at least one memory coupled with the at least one processor; and
   instructions stored in the at least one memory and executable by the at least one processor to cause the apparatus to:
      transmit, to a second UE, a capability notification, the capability notification indicating that the first UE is capable of forwarding, to the second UE, a coded data packet without the first UE decoding a data portuion of the coded data packet;
      receive the coded data packet in a millimeter wave frequency band;
      detect a radio network temporary identifier scrambling code for the coded data packet, wherein the radio network temporary identifier scrambling code indicates that the coded data packet is addressed to the second UE; and
      forward the coded data packet to a second UE based at least in part on the detected radio network temporary identifier scrambling code.

18. The apparatus of claim 17, wherein the instructions to forward the coded data packet further are executable by the at least one processor to cause the apparatus to:
   decode a header portion of the coded data packet based at least in part on the radio network temporary identifier scrambling code associated with the second UE.

19. The apparatus of claim 17, wherein, to detect the radio network temporary identifier scrambling code for the coded data packet, the instructions are further executable by the at least one processor to cause the apparatus to:
   detect an indication that the coded data packet is addressed to the second UE in accordance with the radio network temporary identifier scrambling code.

20. The apparatus of claim 19, wherein the indication comprises a 1-bit physical downlink control channel indicator.

21. The apparatus of claim 17, wherein the instructions are further executable by the at least one processor to cause the apparatus to:
   receive a hybrid automatic repeat request message from the second UE based at least in part on the coded data packet; and
   forward the hybrid automatic repeat request message from the second UE to a network device.

22. The apparatus of claim 21, wherein the instructions are further executable by the at least one processor to cause the apparatus to:
   receive a second coded data packet;
   forward the second coded data packet to the second UE at a first time; and
   forward the hybrid automatic repeat request message to the network device at a second time simultaneous with the first time.

23. The apparatus of claim 21, wherein the hybrid automatic repeat request message comprises a negative acknowledgement, a positive acknowledgement, or another feedback message.

24. The apparatus of claim 17, wherein the instructions are further executable by the at least one processor to cause the apparatus to:
   receive a retransmission of the coded data packet, wherein the retransmission includes the radio network temporary identifier scrambling code for data packets associated with the second UE; and
   forward the retransmission to the second UE based at least in part on the radio network temporary identifier scrambling code.

25. The apparatus of claim 17, wherein the radio network temporary identifier scrambling code for data packets associated with the second UE is different from a second radio network temporary identifier scrambling code for data packets associated with the first UE.

26. The apparatus of claim 17, wherein the instructions further are executable by the at least one processor to cause the apparatus to:
   detect a second radio network temporary identifier scrambling code for a second coded data packet, wherein the second radio network temporary identifier scrambling code indicates that the second coded data packet is addressed to the first UE; and
   decode the second coded data packet based at least in part on the second radio network temporary identifier scrambling code.

27. An apparatus for wireless communications at a first user equipment (UE), comprising:
   means for transmitting, to a second UE, a capability notification, the capability notification indicating that the first UE is capable of forwarding, to the second UE, a coded data packet without the first UE decoding a data portion of the coded data packet;
   means for receiving the coded data packet in a millimeter wave frequency band;
   means for detecting a radio network temporary identifier scrambling code for the coded data packet, wherein the radio network temporary identifier scrambling code indicates that the coded data packet is addressed to the second UE; and means for forwarding the coded data packet to a second UE based at least in part on the detected radio network temporary identifier scrambling code.

28. A non-transitory computer-readable medium storing code for wireless communications at a first user equipment (UE), the code comprising instructions executable by at least one processor to:
transmit, to a second UE, a capabity notification, the capability notification indicating that the first UE is capable of forwarding, to the second UE, a coded data packet without the first UE decoding a data portion of the coded data packet;
receive the coded data packet in a millimeter wave frequency band;
detect a radio network temporary identifier scrambling code for the coded data packet, wherein the radio network temporary identifier scrambling code indicates that the coded data packet is addressed to the second UE; and
forward the coded data packet to the second UE based at least in part on the detected radio network temporary identifier scrambling code.

* * * * *